United States Patent
Ayrapetian et al.

(10) Patent No.: US 10,553,236 B1
(45) Date of Patent: Feb. 4, 2020

(54) MULTICHANNEL NOISE CANCELLATION USING FREQUENCY DOMAIN SPECTRUM MASKING

(71) Applicant: Amazon Technologies, Inc., Seattle, WA (US)

(72) Inventors: Robert Ayrapetian, Morgan Hill, CA (US); Trausti Thor Kristjansson, San Jose, CA (US); Philip Ryan Hilmes, Sunnyvale, CA (US); Carlo Murgia, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 152 days.

(21) Appl. No.: 15/906,967

(22) Filed: Feb. 27, 2018

(51) Int. Cl.
| | |
|---|---|
| *G10L 21/0232* | (2013.01) |
| *H04B 17/336* | (2015.01) |
| *H04B 7/015* | (2006.01) |
| *G10L 25/21* | (2013.01) |
| *G10L 21/0364* | (2013.01) |
| *G10L 25/84* | (2013.01) |
| *G10L 21/0208* | (2013.01) |

(52) U.S. Cl.
CPC ...... *G10L 21/0232* (2013.01); *G10L 21/0364* (2013.01); *G10L 25/21* (2013.01); *G10L 25/84* (2013.01); *H04B 7/015* (2013.01); *H04B 17/336* (2015.01); *G10L 2021/02082* (2013.01)

(58) Field of Classification Search
CPC ......... G10L 15/20; G10L 15/28; G10L 17/22; G10L 21/0208; G10L 21/0232; G10L 21/0364; G10L 25/21; G10L 25/84; H04B 17/336; H04B 7/015
See application file for complete search history.

(56) References Cited

U.S. PATENT DOCUMENTS

| | | | |
|---|---|---|---|
| 2008/0273716 A1* | 11/2008 | Saito | H04M 9/082 381/93 |
| 2015/0082175 A1* | 3/2015 | Onohara | G06F 3/167 715/728 |
| 2017/0084289 A1* | 3/2017 | Yoo | G10L 25/84 |
| 2018/0240457 A1* | 8/2018 | Hanes | G10L 15/20 |
| 2018/0330743 A1* | 11/2018 | Klimanis | G10L 21/0232 |

* cited by examiner

*Primary Examiner* — Mohammad K Islam
(74) *Attorney, Agent, or Firm* — Pierce Atwood LLP

(57) ABSTRACT

A system configured to improve noise cancellation by reducing attenuation of local speech in proximity to a device. When the local speech is present in both a target signal and a reference signal, performing noise cancellation to remove the reference signal inadvertently attenuates the local speech. To prevent this, the system may perform first noise cancellation to identify frequency bands associated with the local speech and may generate a modified reference signal based on the frequency bands. For example, the system may generate the modified reference signal by applying attenuation to first frequencies associated with the local speech and/or gain to second frequencies that are not associated with the local speech. The system may generate final output audio data by performing noise cancellation using the modified reference signal.

16 Claims, 25 Drawing Sheets

FIG. 1A
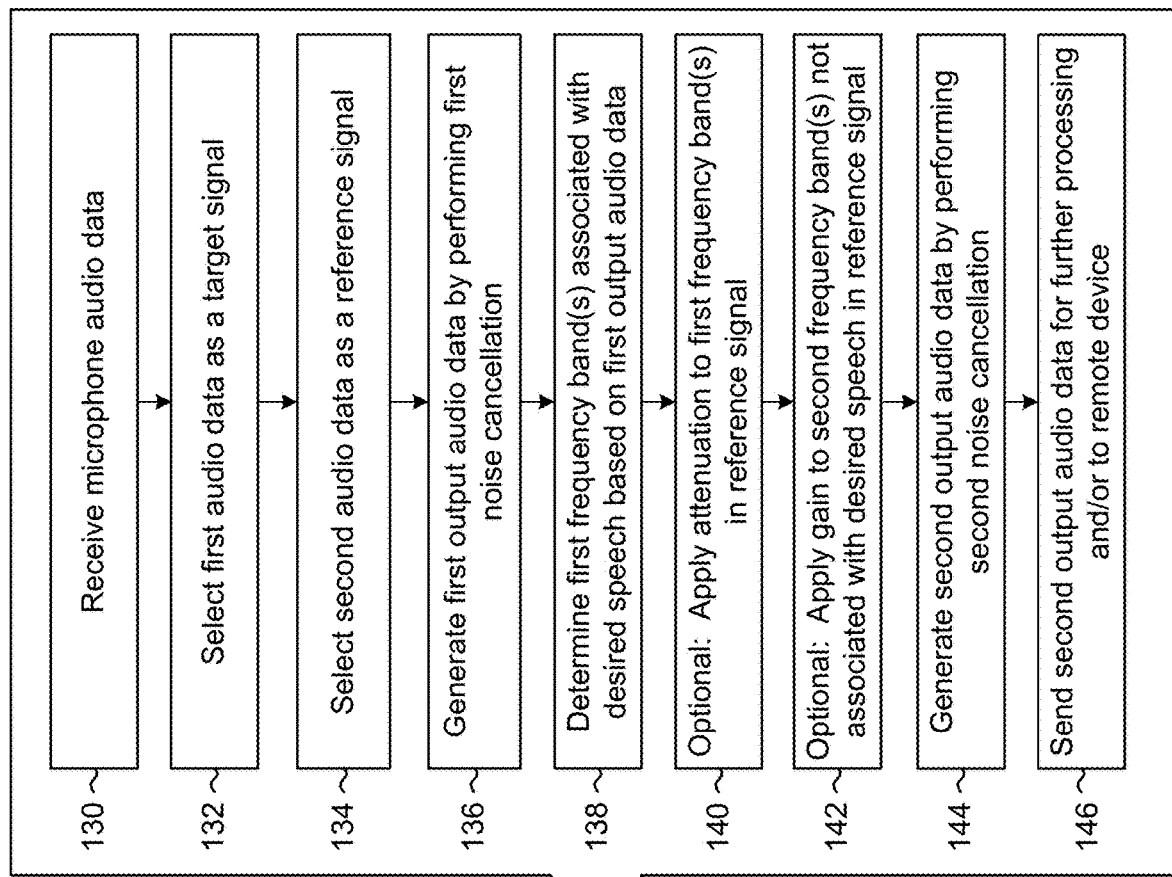
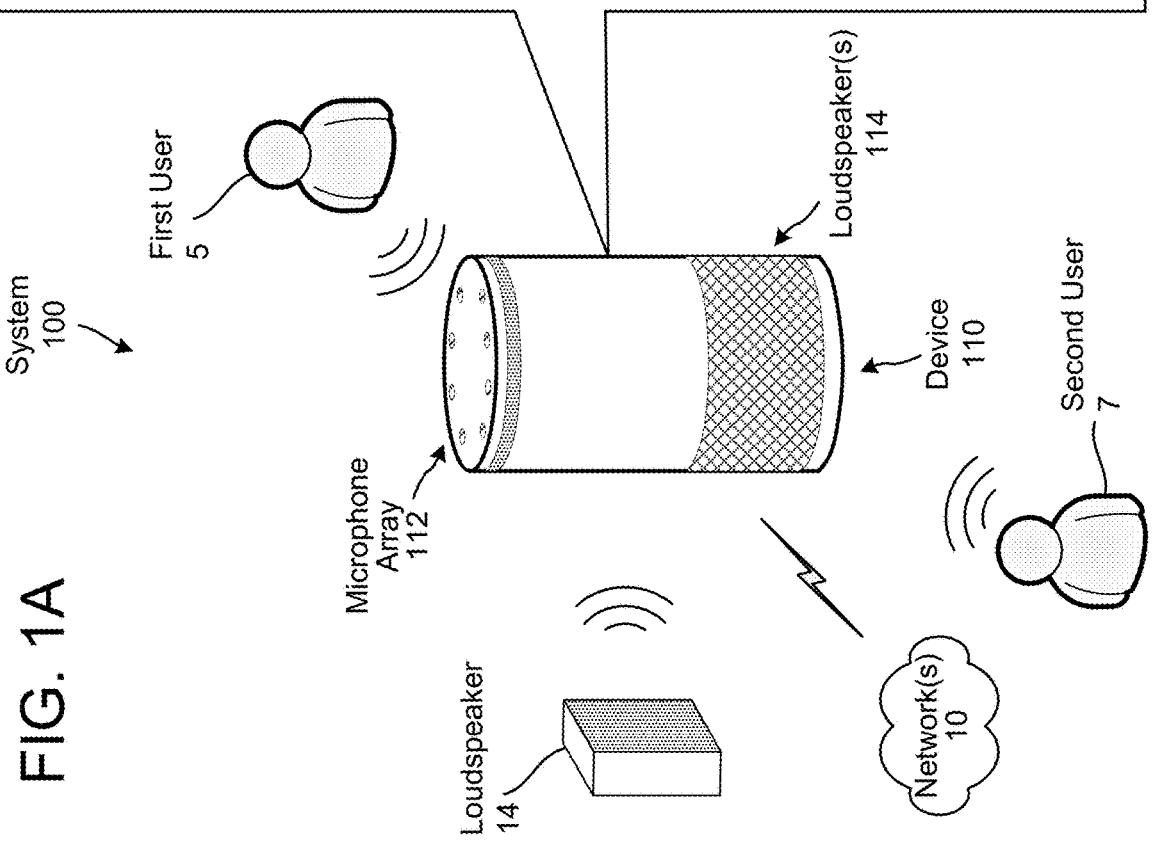

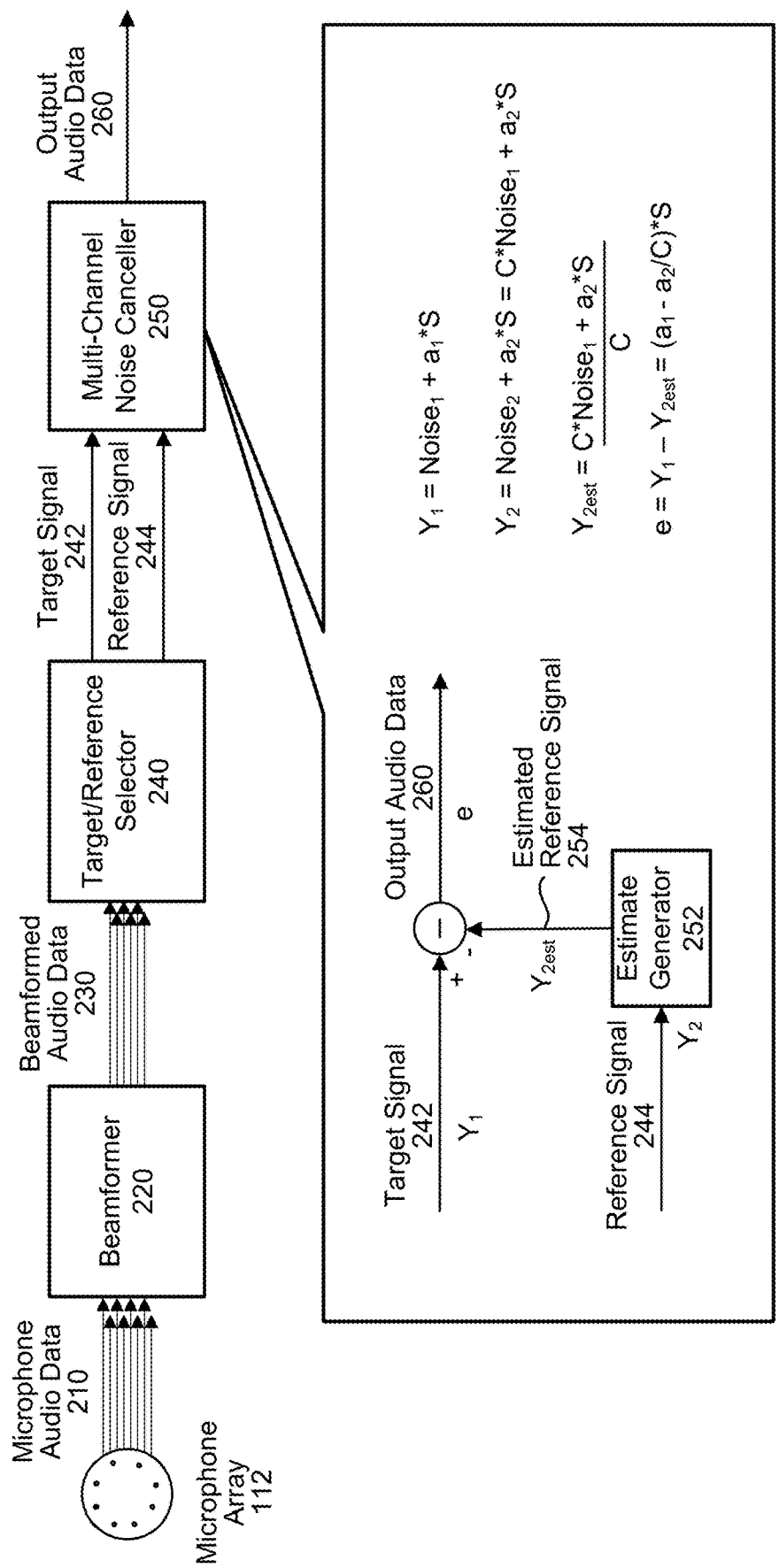

FIG. 4C
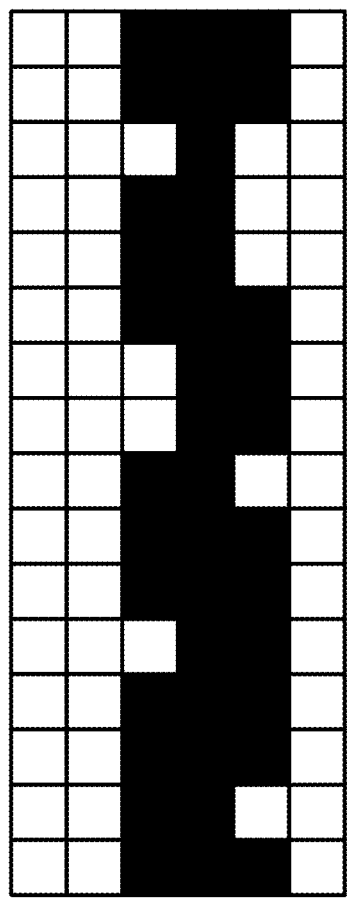
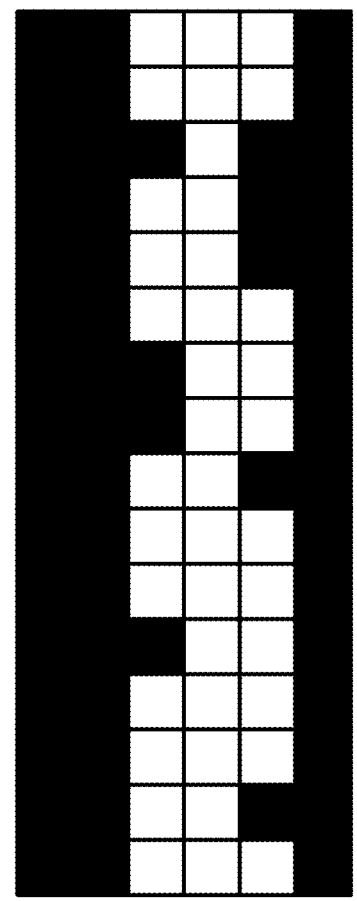
Speech
Mask Data
430
Non-Speech
Mask Data
440

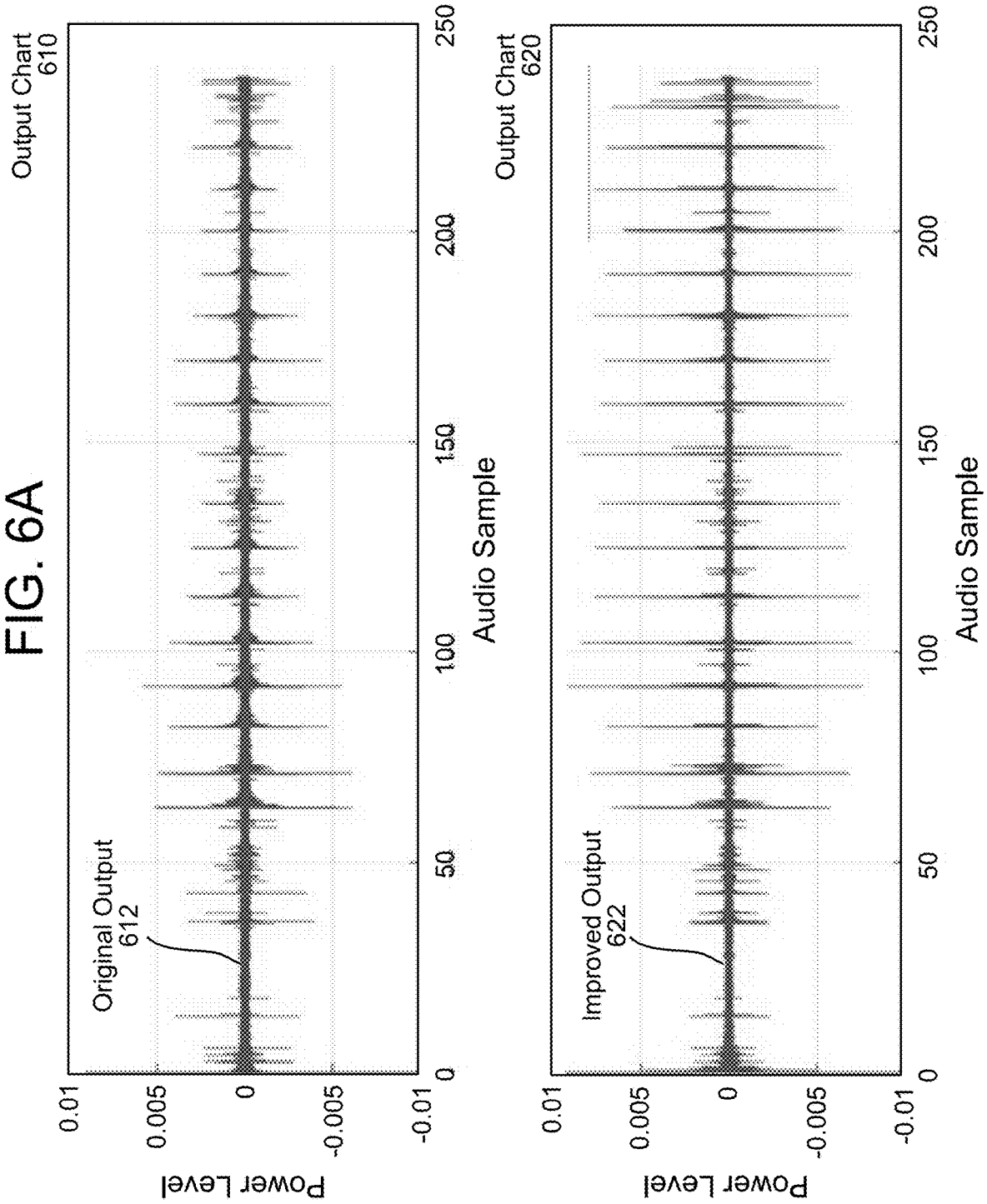

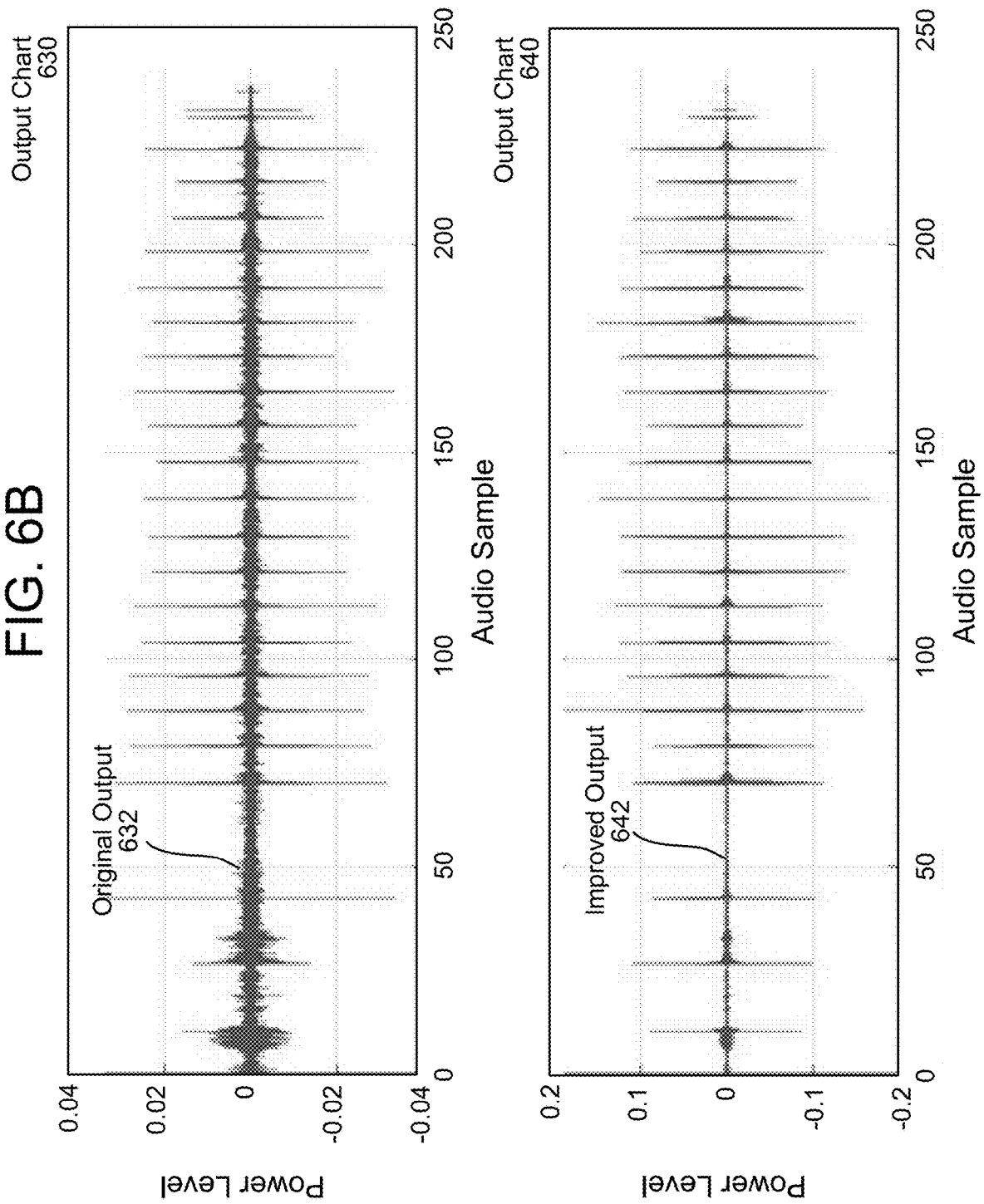

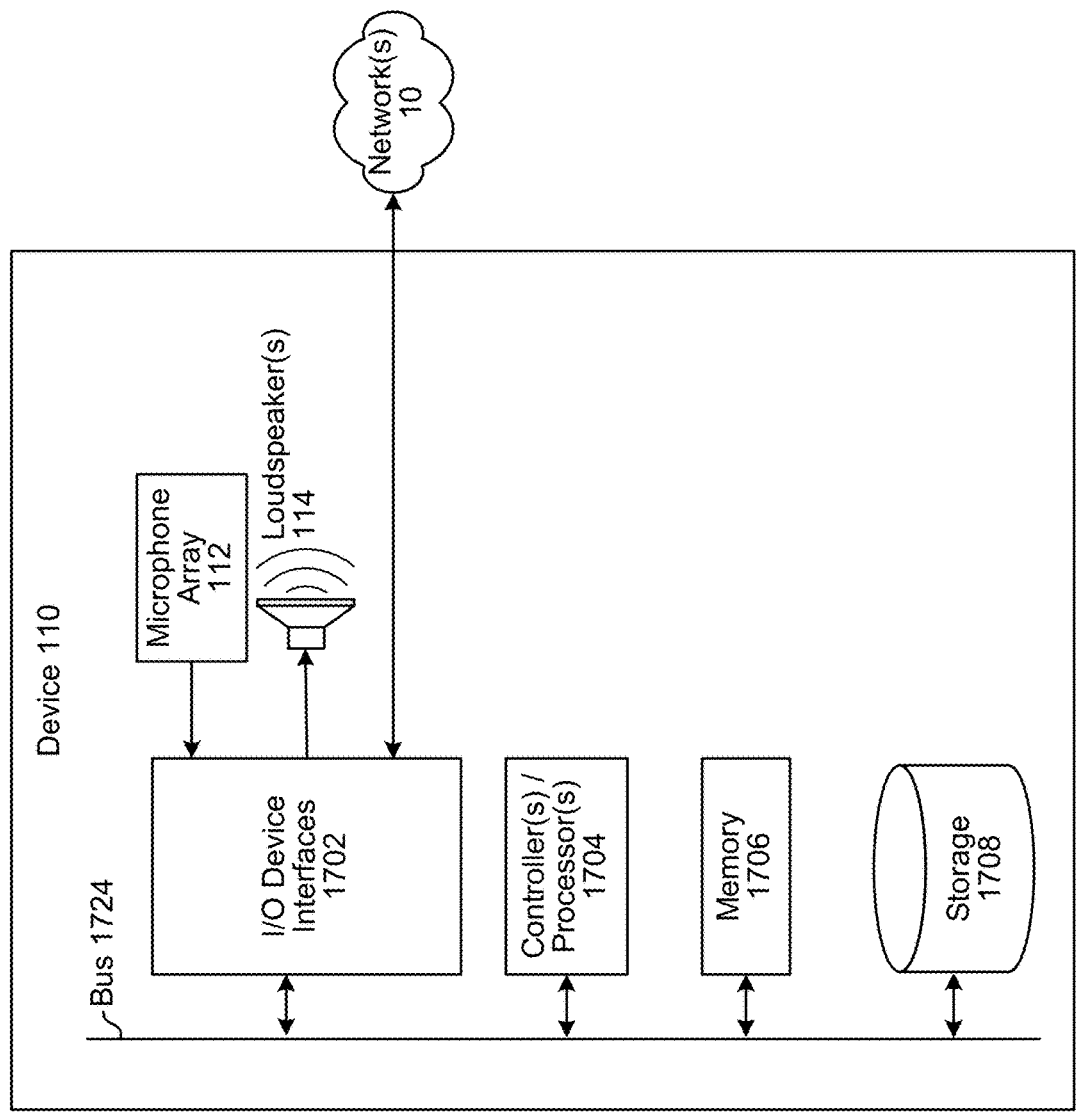

MULTICHANNEL NOISE CANCELLATION USING FREQUENCY DOMAIN SPECTRUM MASKING

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIGS. 1A-1B illustrate systems according to embodiments of the present disclosure.

FIG. 2 illustrates an example of a multi-channel noise canceller.

FIGS. 4A-4C illustrate examples of frequency mask data according to embodiments of the present disclosure.

FIGS. 6A-6B illustrate examples of improvements to output audio data according to embodiments of the present disclosure.

FIG. 17 is a block diagram conceptually illustrating example components of a system according to embodiments of the present disclosure.

DETAILED DESCRIPTION

Figure 1B:
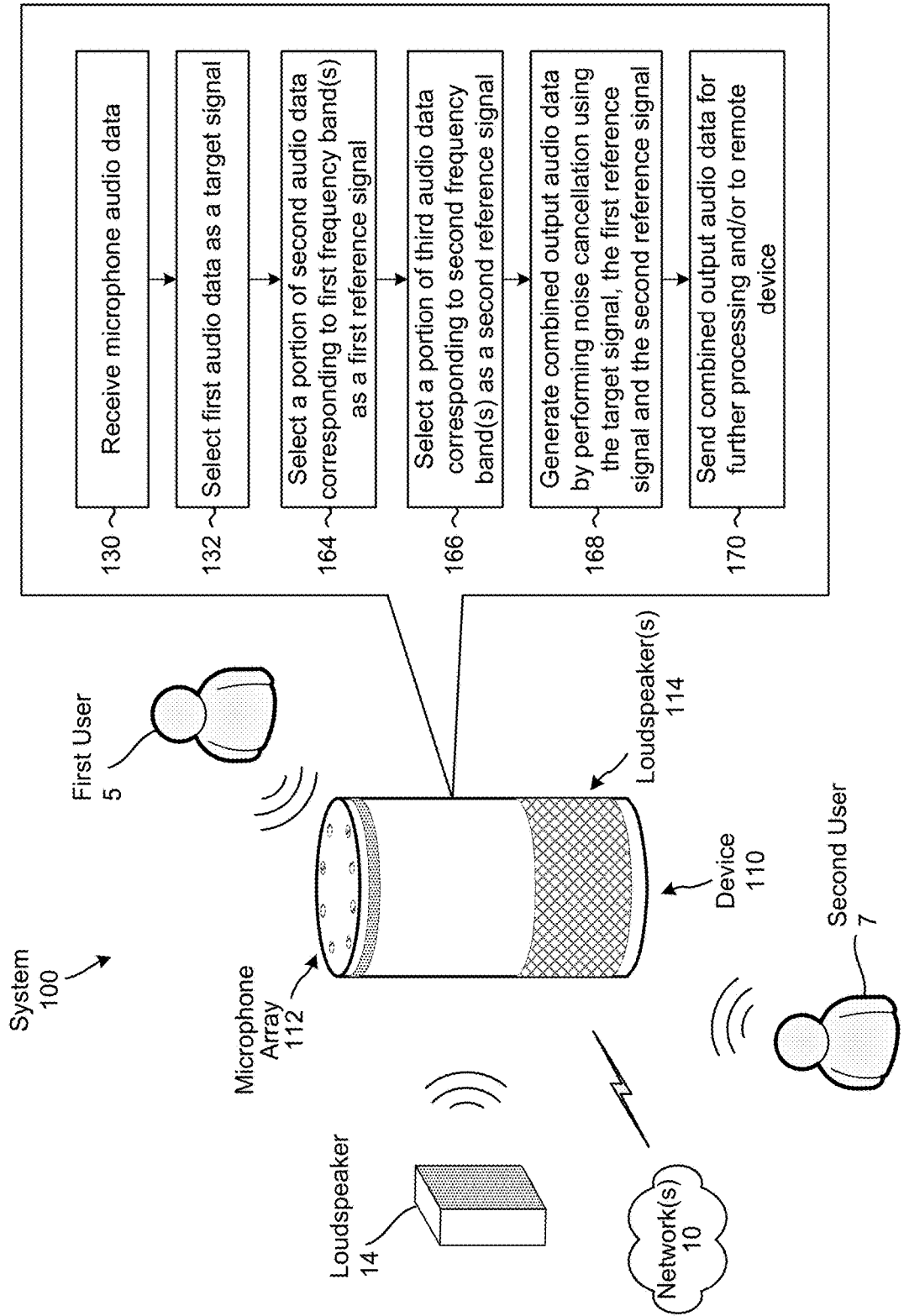

Electronic devices may be used to capture audio and process audio data. The audio data may be used for voice commands and/or sent to a remote device as part of a communication session. To process voice commands from a particular user or to send audio data that only corresponds to the particular user, the device may attempt to isolate desired speech associated with the user from undesired speech associated with other users and/or other sources of noise, such as audio generated by loudspeaker(s) or ambient noise in an environment around the device. An electronic device may perform acoustic echo cancellation to remove, from the audio data, an "echo" signal corresponding to the audio generated by the loudspeaker(s), thus isolating the desired speech to be used for voice commands and/or the communication session from whatever other audio may exist in the environment of the user.

However, some techniques for acoustic echo cancellation can only be performed when the device knows the reference audio data being sent to the loudspeaker, and therefore these techniques cannot remove undesired speech, ambient noise and/or echo signals from loudspeakers not controlled by the device. Other techniques for acoustic echo cancellation solve this problem by estimating the noise (e.g., undesired speech, echo signal from the loudspeaker, and/or ambient noise) based on the audio data captured by a microphone array. For example, these techniques may include fixed beamformers that beamform the audio data (e.g., separate the audio data into portions that corresponds to individual directions) and then perform the acoustic echo cancellation using a target signal associated with one direction and a reference signal associated with a different direction (or all remaining directions). However, while the fixed beamformers enable the acoustic echo cancellation to remove noise associated with a strong signal relative to desired speech, if the desired speech is uniformly distributed to the target signal and the reference signal, performing noise cancellation may inadvertently attenuate the desired speech.

To improve noise cancellation, devices, systems and methods are disclosed that reduce attenuation of the desired speech (e.g., local speech in proximity to a device) by reducing a first average power value of the desired speech in the reference signal relative to a second average power value of noise in the reference signal. For example, a system may perform first noise cancellation to identify first frequency bands associated with the local speech and may generate a modified reference signal based on the first frequency bands. The system may generate the modified reference signal by applying attenuation to first portions of the reference signal within the first frequency bands and/or applying gain to second portions of the reference signal outside of the first frequency bands. The system may then perform second noise cancellation using the modified reference signal, thus avoiding potential attenuation of the local speech.

FIGS. 1A-1B illustrate high-level conceptual block diagrams of a system 100 configured to perform noise cancellation according to embodiments of the present disclosure. Although FIGS. 1A-1B, and other figures/discussion illustrate the operation of the system in a particular order, the steps described may be performed in a different order (as well as certain steps removed or added) without departing from the intent of the disclosure.

As illustrated in FIGS. 1A-1B, the system 100 may include a device 110 that may be communicatively coupled to network(s) 10 and that may include a microphone array 112 and loudspeaker(s) 114. Using the microphone array 112, the device 110 may capture audio data that includes a representation of first speech $s_1(t)$ from a first user 5, a representation of second speech $s_2(t)$ from a second user 7, a representation of audible sound output by a loudspeaker 14, and/or a representation of ambient noise in an environment around the device 110.

The device 110 may be an electronic device configured to capture, process and/or send audio data to remote devices. For ease of illustration, some audio data may be referred to as a signal, such as a playback signal x(t), an echo signal y(t), an echo estimate signal y'(t), a microphone signal z(t), an error signal m(t), or the like. However, the signals may be comprised of audio data and may be referred to as audio data (e.g., playback audio data x(t), echo audio data y(t), echo estimate audio data y'(t), microphone audio data z(t), error audio data m(t), etc.) without departing from the disclosure. As used herein, audio data (e.g., playback audio data, microphone audio data, or the like) may correspond to a specific range of frequency bands. For example, the playback audio data and/or the microphone audio data may correspond to a human hearing range (e.g., 20 Hz-20 kHz), although the disclosure is not limited thereto.

The device 110 may include one or more microphone(s) in the microphone array 112 and/or one or more loudspeaker(s) 114, although the disclosure is not limited thereto and the device 110 may include additional components without departing from the disclosure. For ease of explanation, the microphones in the microphone array 112 may be referred to as microphone(s) 112 without departing from the disclosure.

In some examples, the device 110 may be communicatively coupled to the loudspeaker 14 and may send playback audio data to the loudspeaker 14 for playback. However, the disclosure is not limited thereto and the loudspeaker 14 may receive audio data from other devices without departing from the disclosure. While FIGS. 1A-1B illustrates the microphone array 112 capturing audible sound from the loudspeaker 14, this is intended for illustrative purposes only and the techniques disclosed herein may be applied to any source of audible sound without departing from the disclosure. For example, the microphone array 112 may capture audible sound generated by a device that includes the loudspeaker 14 (e.g., a television) or from other sources of noise (e.g., mechanical devices such as a washing machine, microwave, vacuum, etc.). Additionally or alternatively, while FIGS. 1A-1B illustrates a single loudspeaker 14, the disclosure is not limited thereto and the microphone array 112 may capture audio data from multiple loudspeakers 14 and/or multiple sources of noise without departing from the disclosure.

Using the microphone array 112, the device 110 may capture microphone audio data z(t) corresponding to multiple directions. The device 110 may include a beamformer (e.g., fixed beamformer) and may generate beamformed audio data corresponding to distinct directions. For example, the fixed beamformer may separate the microphone audio data z(t) into distinct beamformed audio data associated with fixed directions (e.g., first beamformed audio data corresponding to a first direction, second beamformed audio data corresponding to a second direction, etc.).

The device 110 may perform noise cancellation (e.g., acoustic echo cancellation (AEC), acoustic interference cancellation (AIC), acoustic noise cancellation (ANC), adaptive acoustic interference cancellation, and/or the like) to remove audio data corresponding to noise from audio data corresponding to desired speech (e.g., first speech $s_1(t)$). For example, the device 110 may perform noise cancellation using a first portion of the microphone audio data z(t) (e.g., first beamformed audio data, which correspond to the first direction associated with the first user 5) as a target signal and a second portion of the microphone audio data z(t) (e.g., second beamformed audio data, third beamformed audio data, and/or remaining portions) as one or more reference signal(s). Thus, the device 110 may perform noise cancellation to remove the one or more reference signal(s) from the target signal.

As used herein, "noise" may refer to any undesired audio data separate from the desired speech (e.g., first speech $s_1(t)$). Thus, noise may refer to the second speech $s_2(t)$, the playback audio generated by the loudspeaker 14, ambient noise in the environment around the device 110, and/or other sources of audible sounds that may distract from the desired speech. Therefore, "noise cancellation" refers to a process of removing the undesired audio data to isolate the desired speech. This process is similar to acoustic echo cancellation and/or acoustic interference cancellation, and noise is intended to be broad enough to include echoes and interference. For example, the device 110 may perform noise cancellation using the first beamformed audio data as a target signal and the second beamformed audio data as a reference signal (e.g., remove the second beamformed audio data from the first beamformed audio data to generate output audio data corresponding to the first speech $s_1(t)$). As used herein, the reference signal may be referred to as an adaptive reference signal and/or noise cancellation may be performed using an adaptive filter without departing from the disclosure.

The device 110 may be configured to isolate the first speech $s_1(t)$ to enable the first user 5 to control the device 110 using voice commands and/or to use the device 110 for a communication session with a remote device (not shown). In some examples, the device 110 may send at least a portion of the microphone audio data z(t) to the remote device as part of a Voice over Internet Protocol (VoIP) communication session. For example, the device 110 may send the microphone audio data to the remote device either directly or via remote server(s) (not shown). However, the disclosure is not limited thereto and in some examples, the device 110 may send at least a portion of the microphone audio data to the remote server(s) in order for the remote server(s) to determine a voice command. For example, the microphone audio data may include a voice command to control the device 110 and the device 110 may send at least a portion of the microphone audio data to the remote server(s), the remote server(s) 120 may determine the voice command represented in the microphone audio data and perform an action corresponding to the voice command (e.g., execute a command, send an instruction to the device 110 and/or other devices to execute the command, etc.). In some examples, to determine the voice command the remote server(s) may perform Automatic Speech Recognition (ASR) processing, Natural Language Understanding (NLU) processing and/or command processing. The voice commands may control the device 110, audio devices (e.g., play music over loudspeakers, capture audio using microphones, or the like), multimedia devices (e.g., play videos using a display, such as a television, computer, tablet or the like), smart home devices (e.g., change temperature controls, turn on/off lights, lock/unlock doors, etc.) or the like without departing from the disclosure.

Prior to sending the microphone audio data to the remote device and/or the remote server(s), the device 110 may perform acoustic echo cancellation (AEC) and/or residual echo suppression (RES) to isolate local speech captured by the microphone(s) 112 and/or to suppress unwanted audio data (e.g., undesired speech, echoes and/or ambient noise). For example, the device 110 may be configured to isolate the first speech $s_1(t)$ associated with the first user 5 and ignore the second speech $s_2(t)$ associated with the second user, the audible sound generated by the loudspeaker 14 and/or the ambient noise. Thus, noise cancellation refers to the process of isolating the first speech $s_1(t)$ and removing ambient noise and/or acoustic interference from the microphone audio data z(t).

To illustrate an example, the device 110 may send playback audio data x(t) to the loudspeaker 14 and the loudspeaker 14 may generate playback audio (e.g., audible sound) based on the playback audio data x(t). A portion of the playback audio captured by the microphone array 112 may be referred to as an "echo," and therefore a representation of at least the portion of the playback audio may be referred to as echo audio data y(t). Using the microphone array 112, the device 110 may capture input audio as microphone audio data z(t), which may include a representation of the first speech from the first user 5 (e.g., first speech $s_1(t)$), a representation of the second speech from the second user 7 (e.g., second speech $s_2(t)$), a representation of the ambient noise in the environment around the device 110 (e.g., noise n(t)), and/or a representation of at least the portion of the playback audio (e.g., echo audio data y(t)). Thus, the microphone audio data may be illustrated using the following equation:

$$z(t)=s_1(t))+s_2(t))+y(t)+n(t) \quad [1]$$

To isolate the first speech $s_1(t)$, the device 110 may attempt to remove the echo audio data y(t) from the microphone audio data z(t). However, as the device 110 cannot determine the echo audio data y(t) itself, the device 110 instead generates echo estimate audio data y'(t) that corresponds to the echo audio data y(t). Thus, when the device 110 removes the echo estimate signal y'(t) from the microphone signal z(t), the device 110 is removing at least a portion of the echo signal y(t). The device 110 may remove the echo estimate audio data y'(t), the second speech $s_2(t)$, and/or the noise n(t) from the microphone audio data z(t) to generate an error signal m(t), which roughly corresponds to the first speech $s_1(t)$.

A typical Acoustic Echo Canceller (AEC) estimates the echo estimate audio data y'(t) based on the playback audio data x(t), and may not be configured to remove the second speech $s_2(t)$ and/or the noise n(t). In addition, if the device 110 does not send the playback audio data x(t) to the loudspeaker 14, the typical AEC may not be configured to estimate or remove the echo estimate audio data y'(t).

To improve performance of the typical AEC, and to remove the echo when the loudspeaker 14 is not controlled by the device 110, the device 110 may include the fixed beamformer and may generate the reference signal based on a portion of the microphone audio data z(t). As discussed above, the fixed beamformer may separate the microphone audio data z(t) into distinct beamformed audio data associated with fixed directions (e.g., first beamformed audio data corresponding to a first direction, second beamformed audio data corresponding to a second direction, etc.), and the device 110 may use a first portion (e.g., first beamformed audio data, which correspond to the first direction associated with the first user 5) as the target signal and a second portion (e.g., second beamformed audio data, third beamformed audio data, and/or remaining portions) as the reference signal. Thus, the reference signal corresponds to the estimated echo audio data y'(t), the second speech $s_2(t)$, and/or the noise n(t), and the device 110 may process the reference signal similarly to how a typical AEC processes the echo estimate audio data y'(t) (e.g., determine an estimated reference signal and remove the estimated reference signal from the target signal). As this technique is capable of removing portions of the echo estimate audio data y'(t), the second speech $s_2(t)$, and/or the noise n(t), a noise canceller may be referred to as an Acoustic Interference Canceller (AIC) instead of an AEC.

While the AIC implemented with beamforming is capable of removing acoustic interference from the target signal, performance may suffer when an average power of the reference signal is similar to an average power of the target signal. For example, local speech (e.g., near-end speech, desired speech or the like, such as the first speech $s_1(t)$) may be uniformly distributed to multiple directions (e.g., first beamformed audio data, second beamformed audio data, etc.), such that removing the reference signal from the target signal results in attenuation of the local speech. An example of attenuating the local speech is described below with regard to FIG. 2.

FIG. 2 illustrates an example of a multi-channel noise canceller. As illustrated in FIG. 2, the microphone array 112 may generate microphone audio data 210 and send the microphone audio data to a beamformer 220. For example, the microphone array 112 may include eight microphones spaced apart and therefore the microphone audio data 210 may comprise eight different signals corresponding to the eight microphones. However, the disclosure is not limited thereto and the number of microphones in the microphone array 112 may vary without departing from the disclosure.

The beamformer 220 may receive the microphone audio data 210 and may generate beamformed audio data 230 corresponding to multiple directions. For example, FIG. 2 illustrates the beamformed audio data 230 including six different signals corresponding to six distinct directions (e.g., first beamformed audio data corresponding to the first direction, second beamformed audio data corresponding to the second direction, etc.). However, the disclosure is not limited thereto and the number of different directions may vary without departing from the disclosure.

The beamformer 220 may send the beamformed audio data 230 to a target/reference selector 240, which may select a first portion of the beamformed audio data 230 corresponding to one or more first directions as a target signal 242 and select a second portion of the beamformed audio data 230 corresponding to one or more second directions as a reference signal 244. For example, the target/reference selector 240 may select first beamformed audio data corresponding to a first direction (e.g., in the direction of the first user 5, which corresponds to the first speech $s_1(t)$) as the target signal 242 and may select second beamformed audio data corresponding to a second direction (e.g., in the direction of the loudspeaker 14, which corresponds to the playback audio) as the reference signal 244. This example is intended for ease of illustration and the disclosure is not limited thereto. Instead, the target/reference selector 240 may select two or more directions as the target signal 242 and/or select two or more directions as the reference signal 244 without departing from the disclosure.

The target/reference selector 240 may output the target signal 242 and the reference signal 244 to a multi-channel noise canceller 250, which may remove at least a portion of the reference signal 244 from the target signal 242 to generate output audio data 260. While FIG. 2 illustrates the target/reference selector 240 as a separate component from the multi-channel noise canceller 250, the disclosure is not limited thereto and in some examples, the target/reference selector 240 may be included as a component of the multi-channel noise canceller 250 without departing from the disclosure.

A first average power value (e.g., signal-to-noise ratio (SNR) or the like) associated with the target signal 242 may be different than a second average power value associated with the reference signal 244. For example, a first volume of the playback audio may be much louder than a second volume associated with the first speech $s_1(t)$, resulting in the reference signal 244 having a much higher average power value than the target signal 242. To remove the noise from the target signal 242, the multi-channel noise canceller 250 may include an estimate generator 252 that normalizes the reference signal 244 based on the target signal 242 to generate an estimated reference signal 254. For example, the estimate generator 252 may determine a ratio of the second average power value to the first average power value (e.g., $SNR_2/SNR_1$) and may attenuate the reference signal 244 based on the ratio (e.g., divide the reference signal 244 by the ratio to generate the estimated reference signal 254). The estimate generator 252 may correspond to one or more components included in an acoustic echo canceller without departing from the disclosure. In some examples, the estimate generator 252 may determine the first average power value based on a portion of the target signal 242 that corresponds to the noise and determine the second average power value based on a portion of the reference signal 244 that corresponds to the noise, although the disclosure is not limited thereto.

FIG. 2 illustrates an example of generating the output audio data 260. As illustrated in FIG. 2, the target signal 242 (e.g., $Y_1$) may correspond to a first representation of the noise (e.g., $Noise_1$) and a first representation of the desired speech (e.g., $a_1*S$), and the reference signal 244 (e.g., $Y_2$) may correspond to a second representation of the noise (e.g., $Noise_2$) and a second representation of the desired speech (e.g., $a_2*S$). The ratio of a second average power value associated with the second representation of the noise to a first average power value associated with the first representation of the noise is indicated by a ratio value C (e.g., $C=Noise_2/Noise_1$), such that the reference signal 244 may be rewritten as $Y_2=C*Noise_1+a_2*S$. Thus, to cancel the first representation of the noise ($Noise_1$) represented in the target signal 242, the multi-channel noise canceller 250 may normalize the reference signal 244 by dividing the reference signal 244 (e.g., $Y_2$) by the ratio value C to generate the estimated reference signal 254 (e.g., $Y_{2est}=(C*Noise_1+a_2*S)/C$). The multi-channel noise canceller 250 may then perform noise cancellation by subtracting the estimated reference signal 254 (e.g., $Y_{2est}$) from the target signal 242 (e.g., $Y_1$) to generate the output audio data 260 (e.g., $e=Y_1-Y_{2est}=(a_1-a_2/C)*S$).

When the second average power level associated with the reference signal 244 is similar to the first average power associated with the target signal 242 (e.g., $Noise_2 \approx Noise_1$), the ratio value C results in minimal attenuation of the second representation of the desired speech (e.g., $a_2*S$) in the estimated reference signal 254. Therefore, a third representation of the desired speech (e.g., $a_3*S$, where $a_3=a_1-a_2/C$) represented in the output audio data 260 may be reduced (e.g., local speech is attenuated). For example, the third representation of the desired speech (e.g., $a_3*S$) corresponds to a difference between the first representation of the desired speech (e.g., $a_1*S$) and a quotient of the second representation of the desired speech (e.g., $a_2*S$) divided by the ratio value C (e.g., $a_3*S=a_1*S-(a_2/C)*S$). As the ratio value C decreases (e.g., $C \rightarrow 1$), the quotient increases and results in a larger portion of the first representation of the desired speech (e.g., $a_1*S$) being attenuated by the second representation of the desired speech (e.g., $a_2*S$).

To improve noise cancellation and reduce the attenuation of the desired speech in the output audio data, the system 100 of the present invention is configured to effectively attenuate the second representation of the desired speech (e.g., $a_2*S$) relative to the second representation of the noise (e.g., $Noise_2$) represented in the estimated reference signal. For example, the device 110 may identify first frequency band(s) that correspond to the desired speech and may attenuate first portions of the reference signal that correspond to the first frequency band(s) (e.g., attenuate the second representation of the desired speech) and/or amplify second portions of the reference signal that do not correspond to the first frequency band(s) (e.g., amplify the second representation of the noise).

Figure 3:
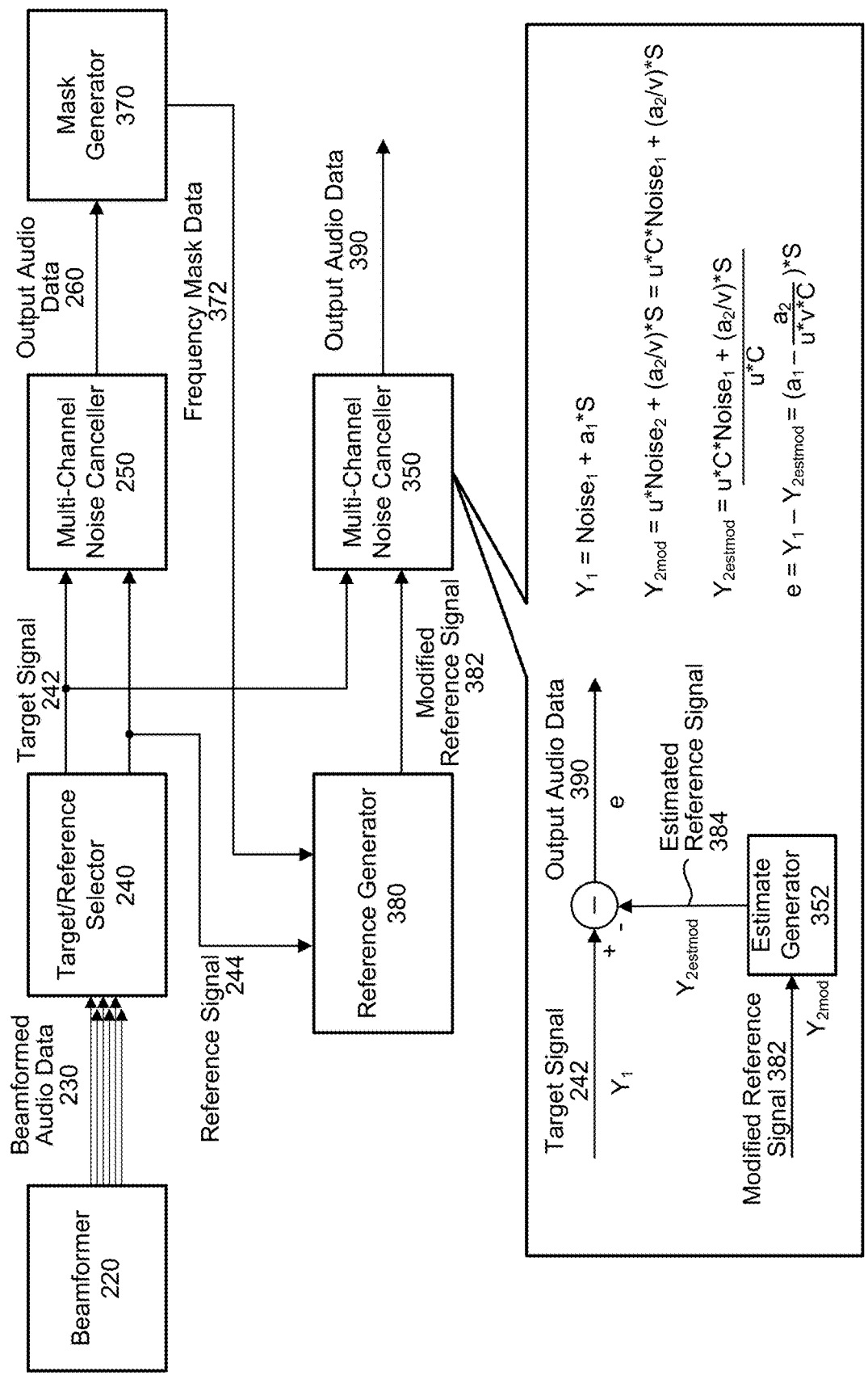
FIG. 3 illustrates an example of performing noise cancellation using frequency masking according to embodiments of the present disclosure.

FIG. 3 illustrates an example of performing noise cancellation using frequency masking according to embodiments of the present disclosure. As illustrated in FIG. 3, the beamformer 220 may send the beamformed audio data 230 to the target/reference selector 240, the target/reference selector 240 may send the target signal 242 and the reference signal 244 to a first multi-channel noise canceller 250 at a first time, and the first multi-channel noise canceller 250a may perform first noise cancellation to generate the output audio data 260, as described above with regard to FIG. 2.

Instead of outputting the output audio data 260 for additional processing or to a remote device, FIG. 3 illustrates that the device 110 can send the output audio data 260 to a mask generator 370 that is configured to identify the first frequency band(s) that correspond to the desired speech. For example, the mask generator 370 may analyze the first output audio data and determine first frequency bands that correspond to the first speech $s_1(t)$ associated with the first user 5. The mask generator 370 may generate frequency mask data 372, which corresponds to a time-frequency map that indicates the first frequency bands that are associated with the first speech $s_1(t)$ over time.

In order to generate the frequency mask data 372, the device 110 may divide the digitized output audio data 260 into frames representing time intervals and may separate the frames into separate frequency bands. The mask generator 370 may generate the frequency mask data 372 using several techniques, which are described in greater detail below with regard to FIGS. 8A-8C.

Figure 4A:
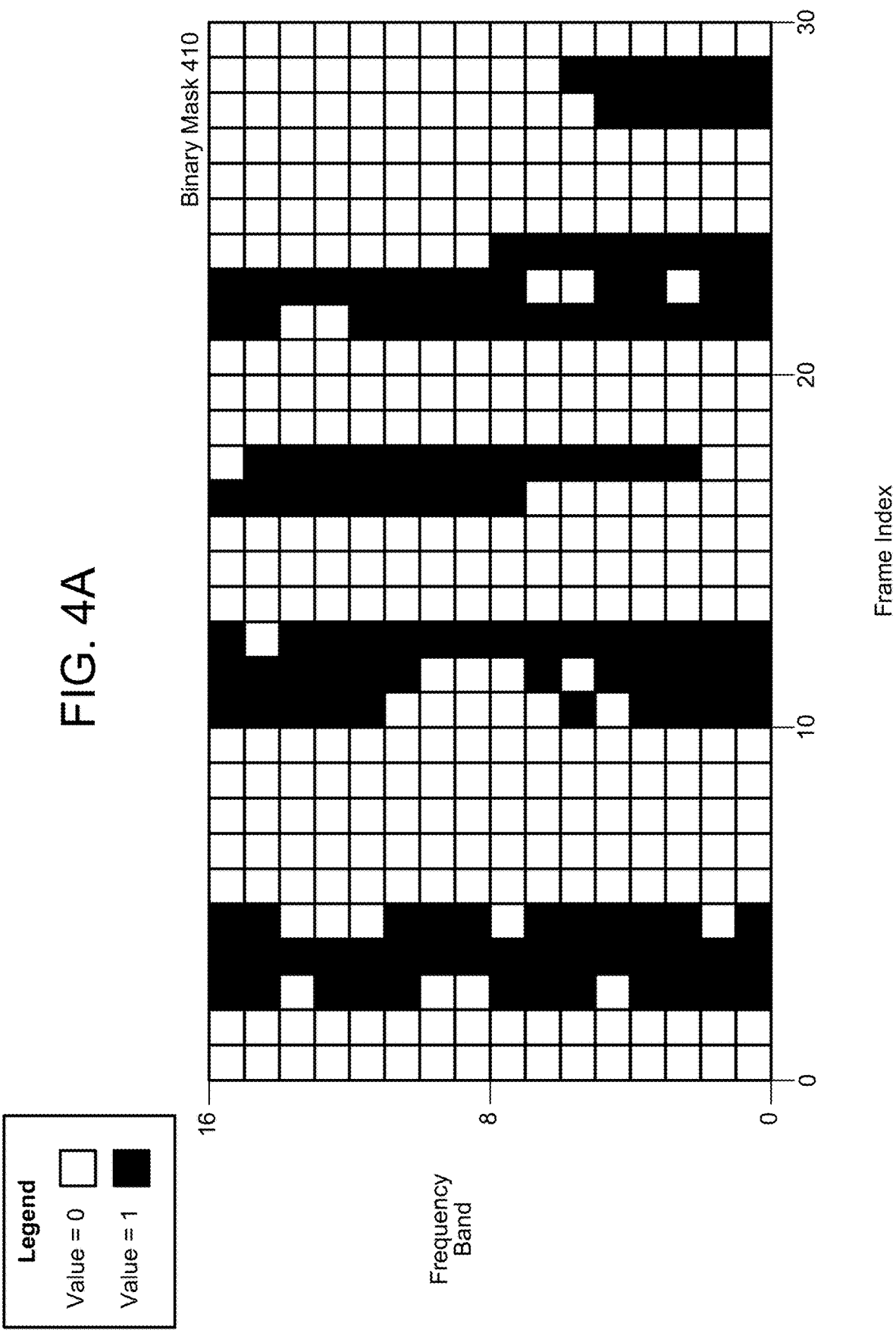
Figure 4B:
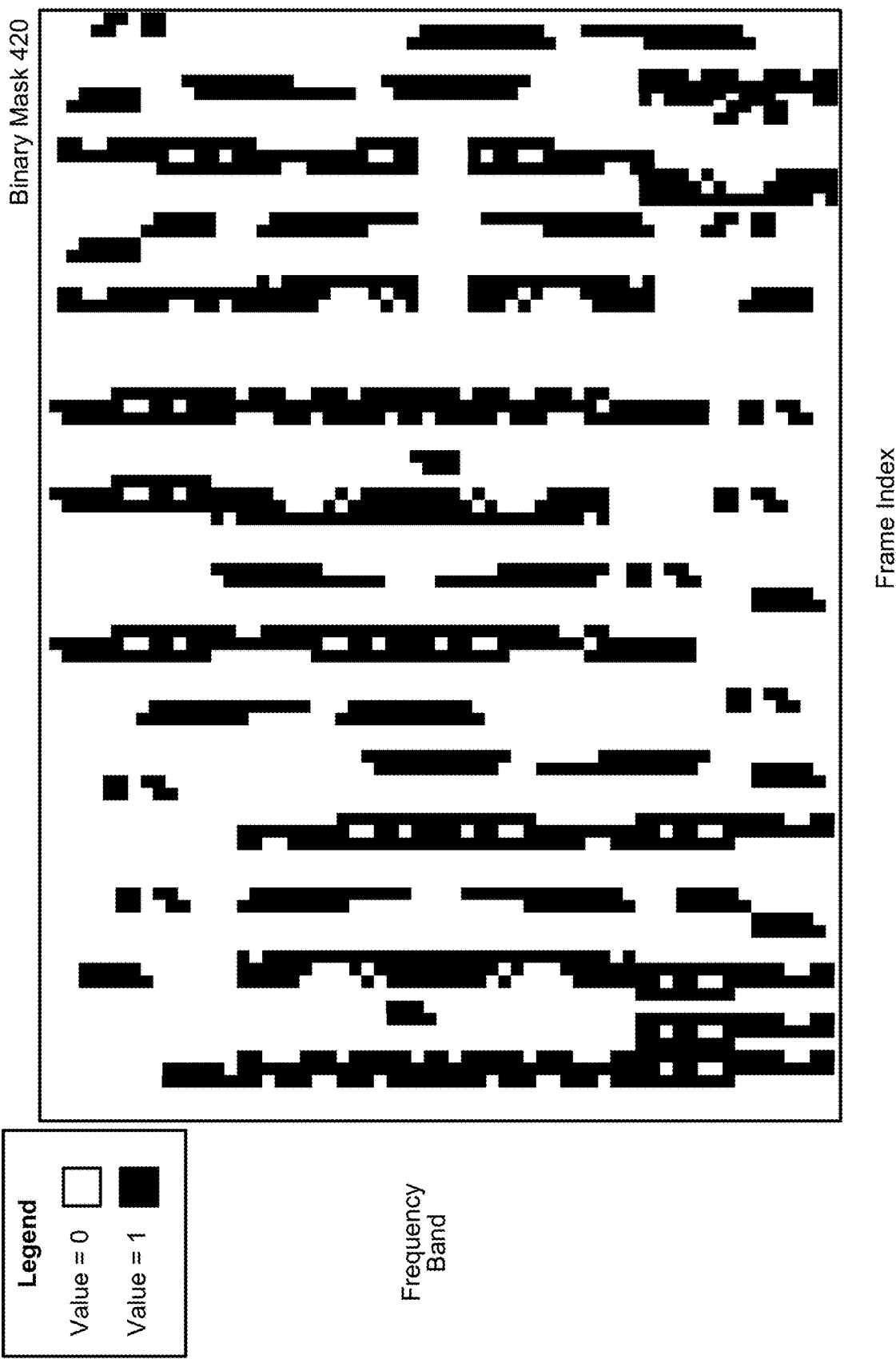

FIGS. 4A-4C illustrate examples of frequency mask data according to embodiments of the present disclosure. As illustrated in FIG. 4A, the mask generator 370 may analyze the output audio data 260 over time to determine which frequency bands and frame indexes correspond to the desired speech. For example, mask generator 370 may generate a binary mask 410 indicating first frequency bands that correspond to the desired speech, with a value of 0 (e.g., white) indicating that the frequency band does not correspond to the desired speech and a value of 1 (e.g., black) indicating that the frequency band does correspond to the desired speech.

The binary mask 410 indicates frequency bands along the vertical axis and frame indexes along the horizontal axis. For ease of illustration, the binary mask 410 includes only a few frequency bands (e.g., 16). However, the device 110 may determine gain values for any number of frequency bands without departing from the disclosure. For example, FIG. 4B illustrates a binary mask 420 corresponding to 64 frequency bands, although the device 110 may generate a binary mask for 128 frequency bands or more without departing from the disclosure.

While FIGS. 4A-4B illustrate binary masks, the disclosure is not limited thereto and the frequency mask data 372 may correspond to continuous values, with black representing a mask value of one (e.g., high likelihood that the desired speech is detected), white representing a mask value of zero (e.g., low likelihood that the desired speech is detected), and varying shades of gray representing intermediate mask values between zero and one (e.g., specific confidence level corresponding to a likelihood that the desired speech is detected).

While the examples described above refer to the continuous values of the frequency mask data 372 indicating a likelihood that the desired speech is detected, the disclosure is not limited thereto. Instead, the continuous values of the frequency mask data 372 may indicate a percentage of the output audio data 260 that corresponds to the speech for each time-frequency unit (e.g., a first time-frequency unit corresponds to a first time interval and a first frequency band) without departing from the disclosure. For example, the device 110 may estimate the percentage of the output audio data 260 that corresponds to the speech for a first time-frequency unit by determining a first estimated value corresponding to a speech signal (e.g., actual value of speech) and a second estimated value corresponding to the noise (e.g., actual value of noise) and dividing the first estimated value by a total value (e.g., a sum of the first estimated value and the second estimated value). In some examples, the device 110 may generate first frequency mask data 372a corresponding to estimated values of the speech signal for each of the time-frequency units and second frequency mask data 372b corresponding to estimated values of the noise for each of the time-frequency units without departing from the disclosure.

Additionally or alternatively, the frequency mask data 372 may indicate second frequency bands that do not correspond to the first speech $s_1(t)$ (e.g., second frequency bands that correspond to the noise). For example, FIG. 4C illustrates speech mask data 430 that corresponds to the desired speech and non-speech mask data 440 that does not correspond to the desired speech. If the frequency mask data 372 is binary (e.g., values of zero or one), the frequency mask data 372 may correspond to either the speech mask data 430 or the non-speech mask data 440 and the device 110 may determine the first frequency bands and/or the second frequency bands by inverting the frequency mask data 372 accordingly.

The mask generator 370 may send the frequency mask data 372 to a reference generator 380. The reference generator 380 may determine the first frequency band(s) associated with the desired speech and/or the second frequency bands associated with the noise and may selectively apply gain or attenuation to the reference signal 244 to generate a modified reference signal 382. For example, the reference generator 380 may determine the first frequency bands associated with the desired speech and may attenuate first portion(s) of the reference signal 244 that correspond to the first frequency bands. Additionally or alternatively, the reference generator 380 may determine the second frequency bands associated with the noise and may amplify second portion(s) of the reference signal 244 that correspond to the second frequency bands. By increasing an average power value of the second portion(s) that correspond to the noise relative to an average power value of the first portion(s) that correspond to the desired speech, the reference generator 380 attenuates the second representation of the desired speech (e.g., $a_2*S$) in the modified reference signal 382.

The reference generator 380 may output the modified reference signal 382 to a multi-channel noise canceller 350. The multi-channel noise canceller 350 may also receive the target signal 242 from the target/reference selector 240 and may perform second noise cancellation to remove at least a portion of the modified reference signal 382 from the target signal 242 to generate second output audio data 390. For ease of illustration, FIG. 3 illustrates the multi-channel noise canceller 350 as being a separate component from the multi-channel noise canceller 250, which illustrates that the device 110 performs noise cancellation in two stages (e.g., a first pass to identify the first frequency bands and a second pass to generate the final output audio data). However, the disclosure is not limited thereto and a single multi-channel noise canceller may generate the output audio data 260 at a first time and the second output audio data 390 at a second time without departing from the disclosure. Additionally or alternatively, while the disclosure illustrates the noise canceller as being a multi-channel noise canceller, the disclosure is not limited thereto and the device 110 may include one or more single-channel noise cancellers without departing from the disclosure. In addition, while FIG. 3 illustrates the reference generator 380 as a separate component, the disclosure is not limited thereto and the reference generator 380 may be incorporated within the target/reference selector 240, the multi-channel noise canceller 350, and/or the multi-channel noise canceller 250 (e.g., if the device 110 only includes a single noise canceller that generates both the output audio data 260 and the second output audio data 390).

FIG. 3 illustrates an example of generating the second output audio data 390. As discussed above, a first average power value (e.g., signal-to-noise ratio (SNR) or the like) associated with the target signal 242 may be different than a second average power value associated with the modified reference signal 382. For example, a first volume of the playback audio may be much louder than a second volume associated with the first speech $s_1(t)$, resulting in the modified reference signal 382 having a much higher average power value than the target signal 242. Additionally or alternatively, even if average power values of the target signal 242 and the reference signal 244 are similar, an average power value of the modified reference signal 382 may be different due to the gain applied to the second portions of the reference signal 244.

To remove the noise from the target signal 242 (e.g., $Y_1$), the multi-channel noise canceller 350 may include an estimate generator 352 that normalizes the modified reference signal 382 (e.g., $Y_{2mod}$) based on the target signal 242 to generate an estimated reference signal 384 (e.g., $Y_{2estmod}$). For example, the estimate generator 352 may determine a ratio of the second average power value to the first average power value (e.g., $SNR_2/SNR_1$) and may attenuate the modified reference signal 382 based on the ratio (e.g., divide the modified reference signal 382 by the ratio to generate the estimated reference signal 384). The estimate generator 352 may correspond to one or more components included in an acoustic echo canceller 350 without departing from the disclosure. In some examples, the estimate generator 352 may determine the first average power value based on a portion of the target signal 242 that corresponds to the noise and determine the second average power value based on a portion of the modified reference signal 382 that corresponds to the noise, although the disclosure is not limited thereto.

As illustrated in FIG. 3, the target signal 242 (e.g., $Y_1$) may correspond to the first representation of the noise (e.g., $Noise_1$) and the first representation of the desired speech (e.g., $a_1*S$), whereas the modified reference signal 382 (e.g., $Y_{2mod}$) may correspond to a product of the gain value u and the second representation of the noise (e.g., $Noise_2$) and a quotient of the second representation of the desired speech (e.g., $a_2*S$) divided by the attenuation value v. While FIG. 3 illustrates the second representation of the desired speech (e.g., $a_2*S$) being divided by the attenuation value v (e.g., when 1≤v), the disclosure is not limited thereto and the second representation of the desired speech (e.g., $a_2*S$) may be multiplied by the attenuation value v without departing from the disclosure (e.g., when 0≤v≤1).

As discussed above, the ratio of the second average power level associated with the reference signal 244 to the first average power associated with the target signal 242 is indicated by ratio value C (e.g., $C=Noise_2/Noise_1$), such that the modified reference signal 382 may be rewritten as $$Y_{2mod} = u*C*Noise_1 + \left(\frac{a2}{v}\right)*S.$$

Thus, to cancel the first representation of the noise ($Noise_1$) represented in the target signal 242, the multi-channel noise canceller 350 may normalize the modified reference signal 382 (e.g., $Y_{2mod}$) by dividing the modified reference signal 382 by a product of the gain value u and the ratio value C (e.g., $u*C$) to generate the estimated reference signal 384

$$\left(e.g., Y_{2estmod} = \frac{u*C*Noise1 + \frac{a2}{v}*S}{u*C}\right).$$

To perform noise cancellation, the multi-channel noise canceller 350 may then subtract the estimated reference signal 384 (e.g., $Y_{2estmod}$) from the target signal 242 (e.g., $Y_1$) to generate the second output audio data 390

$$\left(e.g., Y_1 - Y_{2estmod} - \left(a_1 - \frac{a2}{u*v*C}\right)*S\right).$$

By applying the gain value u and/or the attenuation value v to generate the modified reference signal 382, the device 110 reduces an amount that the second representation of the desired speech (e.g., $a_2*S$) attenuates the first representation of the desired speech (e.g., $a_1*S$) in the second output audio data 390. For example, even when the second average power level associated with the reference signal 244 is similar to the first average power associated with the target signal 242 (e.g., $Noise_2 \approx Noise_1$, resulting in $C \approx 1$), dividing the second representation of the desired speech (e.g., $a_2*S$) by the gain value u and/or the attenuation value v ensures that only a fraction of the second representation of the desired speech (e.g., $a_2*S$) is removed from the first representation of the desired speech (e.g., $a_1*S$). Therefore, a fourth representation of the desired speech $$\left(e.g., a_4*S, \text{where } a_4 = a_1 - \frac{a2}{u*v*C}\right)$$

represented in the second output audio data 390 is increased relative to the third representation of the desired speech (e.g., $a_3*S$) represented in the output audio data 260.

While FIG. 3 illustrates the reference generator 380 applying both the gain value u and the attenuation value v to generate the modified reference signal 382, the disclosure is not limited thereto and the reference generator 380 may apply the gain value u and/or the attenuation value v without departing from the disclosure. For example, if the reference generator 380 amplifies the second portion(s) by the gain value u but does not attenuate the first portion(s) by the attenuation value v, the equations discussed above are still applicable by setting the attenuation value v equal to a value of 1 (e.g., v=1). Similarly, if the reference generator 380 attenuates the first portion(s) by the attenuation value v but does not amplify the second portion(s) by the gain value u, the equations discussed above are still applicable by setting the gain value u equal to a value of 1 (e.g., u=1).

The examples described above refer to generating the modified reference signal 382 using binary mask data. For example, the reference generator 380 may determine the first frequency band(s) associated with the desired speech and/or the second frequency bands associated with the noise. Thus, an individual frequency band or time-frequency unit is associated with either the desired speech (e.g., mask value equal to a first binary value, such as 1) or with the noise (e.g., mask value equal to a second binary value, such as 0). The reference generator 380 may then apply the gain value u to the first frequency band(s) and/or apply the attenuation value v to the second frequency band(s) to generate the modified reference signal 382.

However, the disclosure is not limited thereto and the frequency mask data 372 may correspond to continuous values, with black representing a mask value of one (e.g., high likelihood that the desired speech is detected), white representing a mask value of zero (e.g., low likelihood that the desired speech is detected), and varying shades of gray representing intermediate mask values between zero and one (e.g., specific confidence level corresponding to a likelihood that the desired speech is detected). Additionally or alternatively, the continuous values of the frequency mask data 372 may indicate a percentage of the output audio data 260 that corresponds to the speech for each time-frequency unit without departing from the disclosure. For example, the device 110 may estimate the percentage of the output audio data 260 that corresponds to the speech for a first time-frequency unit by determining a first estimated value corresponding to a speech signal (e.g., actual value of speech) and a second estimated value corresponding to the noise (e.g., actual value of noise) and dividing the first estimated value by a total value (e.g., a sum of the first estimated value and the second estimated value). In some examples, the device 110 may generate first frequency mask data 372a corresponding to estimated values of the speech signal for each of the time-frequency units and generate second frequency mask data 372b corresponding to estimated values of the noise for each of the time-frequency units without departing from the disclosure.

When the frequency mask data 372 corresponds to continuous values, the reference generator 380 may generate the modified reference signal 382 by applying the continuous values, the gain value u, and/or the attenuation value v. To illustrate an example, the reference generator 380 may apply a combination of the gain value u and the attenuation value v to a single time-frequency unit. For example, for a first time-frequency unit, the reference generator 380 may determine a first mask value m of the frequency mask data 372 (e.g., 0≤m≤1) that corresponds to the desired speech (e.g., m indicates a portion of the reference signal associated with the desired speech) and may determine a second mask value n (e.g., 0≤n≤1) that corresponds to the noise (e.g., n indicates a portion of the reference signal associated with the noise). In some examples, the first mask value m and the second mask value n are complements of each other (e.g., n=1−m) and mutually exclusive (e.g., similar to complementary percentages). Thus, the reference generator 380 may determine the first mask value m directly from the frequency mask data 372 (e.g., m=0.7) and may determine the second mask value n based on the first mask value m (e.g., n=1−0.7=0.3). However, the disclosure is not limited thereto and in other examples the reference generator 380 may determine the first mask value m from first frequency mask data 372a and may determine the second mask value n from second frequency mask data 372b.

In order to generate the modified reference signal 382, the reference generator 380 may determine a first product by multiplying the attenuation value v by the first mask value m associated with a time-frequency unit and may determine a first portion of the modified reference signal 382 by applying the first product to the first time-frequency unit. In this example, the attenuation value v is a value between zero and one, which may correspond to a reciprocal of the attenuation value v illustrated in FIG. 3. Thus, the first mask value m controls how much of the attenuation value v is applied to the first time-frequency unit. Additionally or alternatively, the reference generator 380 may determine a second product by multiplying the gain value u by the second mask value n associated with the first time-frequency unit and may determine a second portion of the modified reference signal 382 by applying the second product to the first time-frequency unit. Thus, the second mask value n controls how much of the gain value u is applied to the first time-frequency unit. If the reference generator 380 applies gain to the noise portion and attenuates the speech portion of the reference signal, the modified reference signal 382 is a sum of the first portion and the second portion. However, if the reference generator 380 only applies gain to the noise portion, the first mask value m will be equal to zero and the modified reference signal 382 will correspond to the second portion. Similarly, if the reference generator 380 only applies attenuation to the speech portion, the second mask value n will be equal to zero and the modified reference signal 382 will correspond to the first portion.

As described above with regard to FIG. 3, the estimate generator 352 may determine the estimated reference signal 384 based on the modified reference signal 382. For example, the estimate generator 352 may normalize the modified reference signal 382 by dividing the modified reference signal 382 by a product of the gain value u and the ratio value C (e.g., u*C) to generate the estimated reference signal 384. To combine the steps performed by the reference generator 380 and the estimate generator 352, the device 110 may determine an overall gain value for the time-frequency unit by determining a sum of the first product (e.g., v*m) and the second product (e.g., u*n) and dividing the sum by the gain value u. Thus, the device 110 may generate the estimated reference signal 384 by applying the overall gain value to the reference signal 244 for the time-frequency unit.

Figure 5:
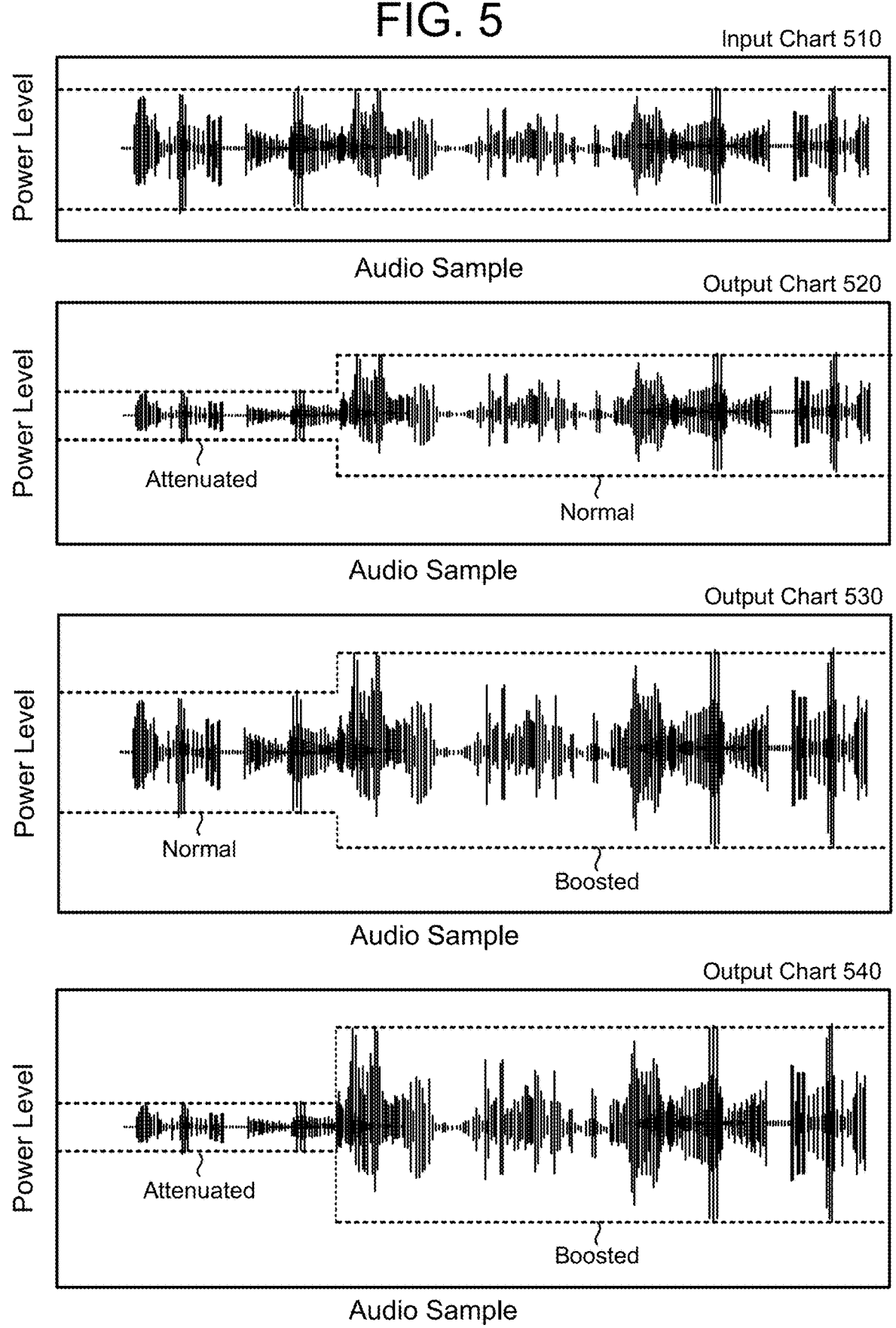
FIG. 5 illustrates examples of modifying a reference signal according to embodiments of the present disclosure.

FIG. 5 illustrates examples of modifying a reference signal according to embodiments of the present disclosure. As illustrated in FIG. 5, the reference signal 244 may correspond to the audio data represented in input chart 510, with an entirety of the audio data associated with a first amplitude value.

If the reference generator 380 applies the attenuation value v but not the gain value u, the modified reference signal 382 may correspond to the audio data represented in output chart 520, with a first portion of the audio data that corresponds to the desired speech associated with a second amplitude value that is lower than the first amplitude value (e.g., first portion is attenuated using the attenuation value v) and a second portion of the audio data that corresponds to the noise associated with the first amplitude value.

If the reference generator 380 applies the gain value u but not the attenuation value v, the modified reference signal 382 may correspond to the audio data represented in output chart 530, with the first portion of the audio data that corresponds to the desired speech associated with the first amplitude value and the second portion of the audio data that corresponds to the noise associated with a third amplitude value that is higher than the first amplitude value (e.g., second portion is amplified using the gain value u).

If the reference generator 380 applies both the gain value u and the attenuation value v, the modified reference signal 382 may correspond to the audio data represented in output chart 540, with the first portion of the audio data that corresponds to the desired speech associated with the second amplitude value that is lower than the first amplitude value (e.g., first portion is attenuated using the attenuation value v) and the second portion of the audio data that corresponds to the noise associated with the third amplitude value that is higher than the first amplitude value (e.g., second portion is amplified using the gain value u).

FIGS. 6A-6B illustrate examples of improvements to output audio data according to embodiments of the present disclosure. FIG. 6A illustrates a first output chart 610 representing an original output 612 generated using the reference signal 244 (e.g., output audio data 260) and a second output chart 620 representing an improved output 622 generated using the modified reference signal 382 (e.g., second output audio data 390). As illustrated in FIG. 6A, the improved output 622 has a much higher signal-to-noise ratio (SNR) value, as the amplitude is increased (e.g., peaks are taller) and the noise is reduced (e.g., thick bar in the middle is thinner) relative to the original output 612.

The improvements resulting from applying the gain value u and/or the attenuation value v to generate the modified reference signal 382 increase as a volume of the playback audio generated by the loudspeaker 14 increases. For example, FIG. 6B illustrates a third output chart 630 representing an original output 632 generated using the reference signal 244 (e.g., output audio data 260) and a fourth output chart 640 representing an improved output 642 generated using the modified reference signal 382 (e.g., second output audio data 390) when a volume level associated with the loudspeaker 14 is increased. As illustrated in FIG. 6B, the improved output 642 has a much higher signal-to-noise ratio (SNR) value, as the amplitude is increased (e.g., peaks are taller) and the noise is reduced (e.g., thick bar in the middle is thinner) relative to the original output 632.

In the example illustrated in FIG. 6A (e.g., lower volume level), a first amplitude of the original output 612 was around 0.005 whereas a second amplitude of the improved output 622 was around 0.009, with a corresponding decrease in the noise values. Thus, an SNR value of the improved output 622 is at least double an SNR value of the original output 612, and may be even more improved depending on the actual noise values.

Similarly, in the example illustrated in FIG. 6B (e.g., higher volume level), a third amplitude of the original output 632 was around 0.03 whereas a fourth amplitude of the improved output 642 was around 0.19, with a corresponding decrease in the noise values. Thus, an SNR value of the improved output 642 is at least five times higher an SNR value of the original output 632 based on the difference in amplitude alone, without regard to the decrease in the noise values.

As illustrated in FIG. 1A, the device 110 may receive (130) microphone audio data from the microphone array 112. The microphone audio data may include a plurality of signals from individual microphones in the microphone array 112, such that the device 110 may perform beamforming to separate the microphone audio data into beamformed audio data associated with unique directions.

The device 110 may select (132) first audio data as a target signal (e.g., select first beamformed audio data associated with a first direction, such as in the direction of the first user 5), may select (134) second audio data as a reference signal (e.g., select second beamformed audio data associated with at least a second direction, such as in the direction of the loudspeaker 14), and may generate (136) first output audio data by performing first noise cancellation. For example, the device 110 may estimate an echo signal based on the reference signal (e.g., second beamformed audio data) and remove the echo estimate signal from the target signal (e.g., first beamformed audio data) to generate the first output audio data.

The device 110 may then determine (138) first frequency band(s) associated with desired speech (e.g., local speech, such as the first speech $s_1(t)$ generated by the first user 5) represented in the first output audio data. For example, the device 110 may identify frequency bands having a positive signal-to-noise ratio (SNR) value in the first output audio data. In some examples, the device 110 may perform additional processing such as noise reduction (NR) processing, residual echo suppression (RES) processing, and/or the like to generate modified output audio data, and may identify frequency bands having a positive SNR value in the modified output audio data. Additionally or alternatively, the device 110 may process the first output audio data using a deep neural network (DNN) and may receive an indication of the first frequency band(s) (e.g., frequency mask data) from the DNN.

The device 110 may optionally apply (140) attenuation to the first frequency band(s) in the reference signal. As described above with regard to the reference generator 380, the first frequency band(s) may correspond to the desired speech and therefore the device 110 may generate a modified reference signal by attenuating first portion(s) of the reference signal that correspond to the first frequency band(s). Additionally or alternatively, the device 110 may optionally apply (142) gain to second frequency band(s) that are not associated with the desired speech in the reference signal. The second frequency band(s) may correspond to the noise and therefore the device 110 may generate the modified reference signal by amplifying second portion(s) of the reference signal that correspond to the second frequency band(s).

While either step 140 or step 142 is optional, in order to improve the speech signal output by the device 110 the device 110 must either apply the attenuation or apply the gain. Thus, the device 110 may apply the attenuation in step 140 but not apply the gain in step 142, may apply the gain in step 142 but not apply the attenuation in step 140, or may apply the attenuation in step 140 and apply the gain in step 142.

The device 110 may generate (144) second output audio data by performing second noise cancellation and may send (146) the second output audio data for further processing and/or to a remote device. For example, the device 110 may estimate an echo signal based on the modified reference signal (e.g., second beamformed audio data after applying attenuation and/or gain) and remove the echo estimate signal from the target signal (e.g., first beamformed audio data) to generate the second output audio data.

As discussed above, generating the modified reference signal by applying the gain value u and/or applying the attenuation value v improves a speech signal output by the device 110 when the second average power level associated with the reference signal 244 is similar to the first average power associated with the target signal 242 (e.g., $Noise_2 \approx Noise_1$). This is because the ratio value C (e.g., $C=Noise_2/Noise_1$) is reduced, resulting in minimal attenuation of the second representation of the desired speech (e.g., $a_2*S$) in the estimated reference signal 254. Therefore, a third representation of the desired speech (e.g., $a_3*S$, where $a_3=a_1-a_2/C$) represented in the output audio data 260 may be reduced (e.g., local speech is attenuated). For example, the third representation of the desired speech (e.g., $a_3*S$) corresponds to a difference between the first representation of the desired speech (e.g., $a_1*S$) and a quotient of the second representation of the desired speech (e.g., $a_2*S$) divided by the ratio value C (e.g., $a_3*S=a_1*S-(a_2/C)*S$). As the ratio value C decreases (e.g., $C \to 1$), the quotient increases and results in a larger portion of the first representation of the desired speech (e.g., $a_1*S$) being attenuated by the second representation of the desired speech (e.g., $a_2*S$).

However, when the second average power level associated with the reference signal 244 is much greater than the first average power associated with the target signal 242 (e.g., $Noise_2 >> Noise_1$), the ratio value C is larger and results in sufficient attenuation of the second representation of the desired speech (e.g., $a_2*S$) in the estimated reference signal 254. Therefore, the device 110 may selectively apply the two-stage noise cancellation only when the ratio value C is reduced. To reduce a latency and/or processing associated with the two-stage noise cancellation, the device 110 may determine that the ratio value C exceeds a threshold and may output the output audio data 260 without additional processing.

Figure 7:
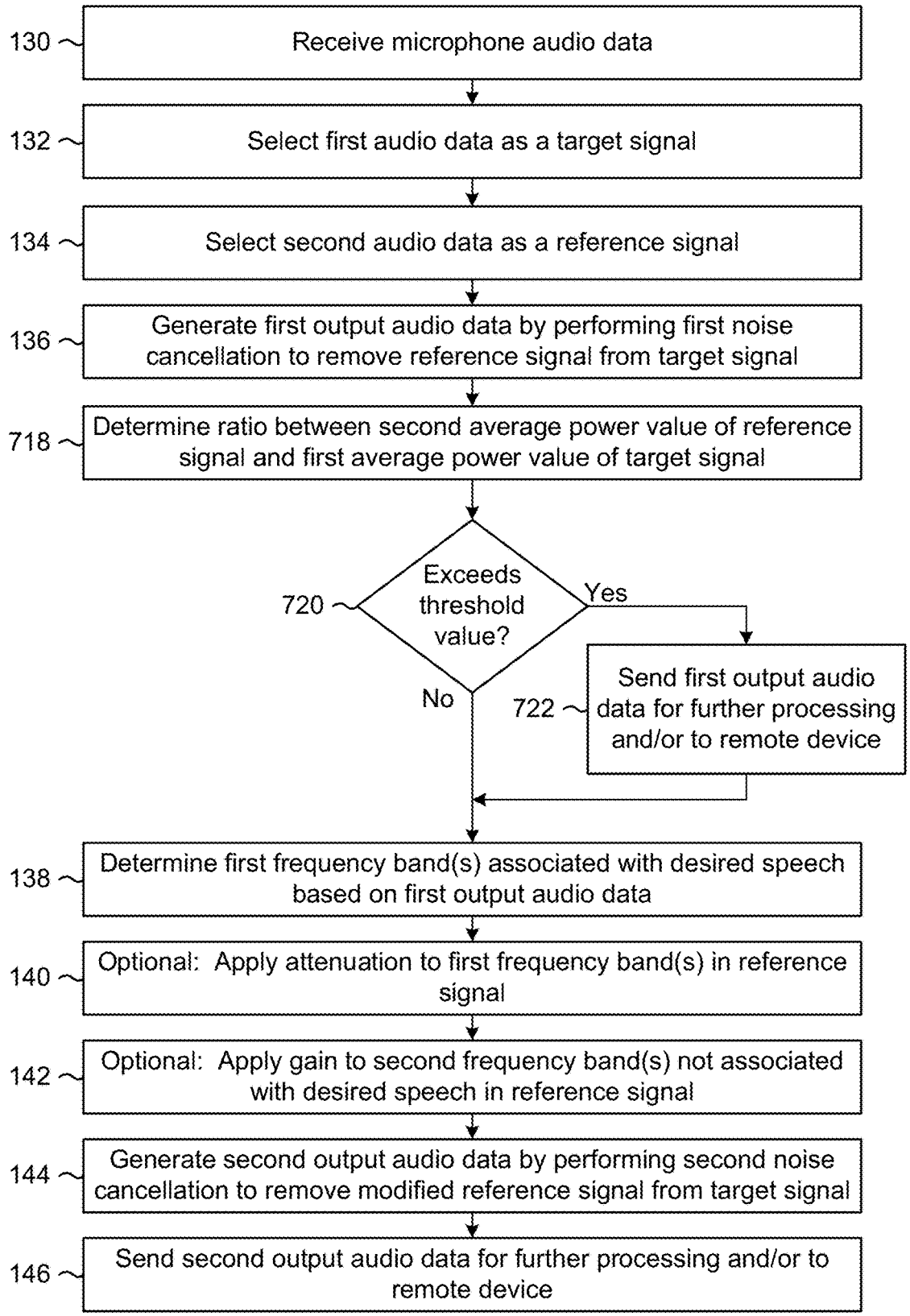
FIG. 7 is a flowchart conceptually illustrating an example method for using frequency masking to improve noise cancellation according to embodiments of the present disclosure.

FIG. 7 is a flowchart conceptually illustrating an example method for using frequency masking to improve noise cancellation according to embodiments of the present disclosure. As illustrated in FIG. 7, the device 110 may perform steps 130-136, as described above with regard to FIG. 1A. After generating the first output audio data, the device 110 may determine (718) a ratio between the second average power value of the reference signal and the first average power value of the target signal (e.g., $C=Noise_2/Noise_1$). The device 110 may determine (7200 whether the ratio exceeds a threshold value, and if so, may send (722) the first output audio data for further processing and/or to the remote device. However, if the ratio does not exceed the threshold value, the device 110 may determine that the ratio value C will not result in sufficient attenuation of the second representation of the desired speech (e.g., $a_2*S$) in the estimated reference signal 254. Therefore, the device 110 may perform steps 138-146, as described above with regard to FIG. 1A, to generate the second output audio data.

Figure 8A:
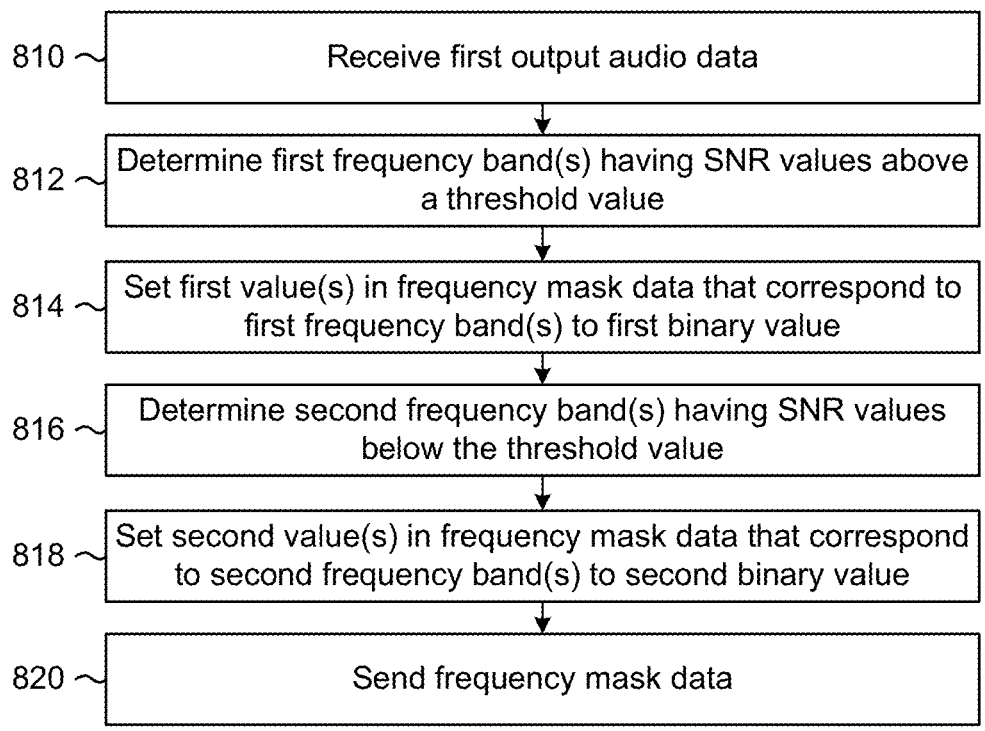
FIGS. 8A-8C are flowcharts conceptually illustrating example methods for generating frequency mask data according to embodiments of the present disclosure.
Figure 8B:
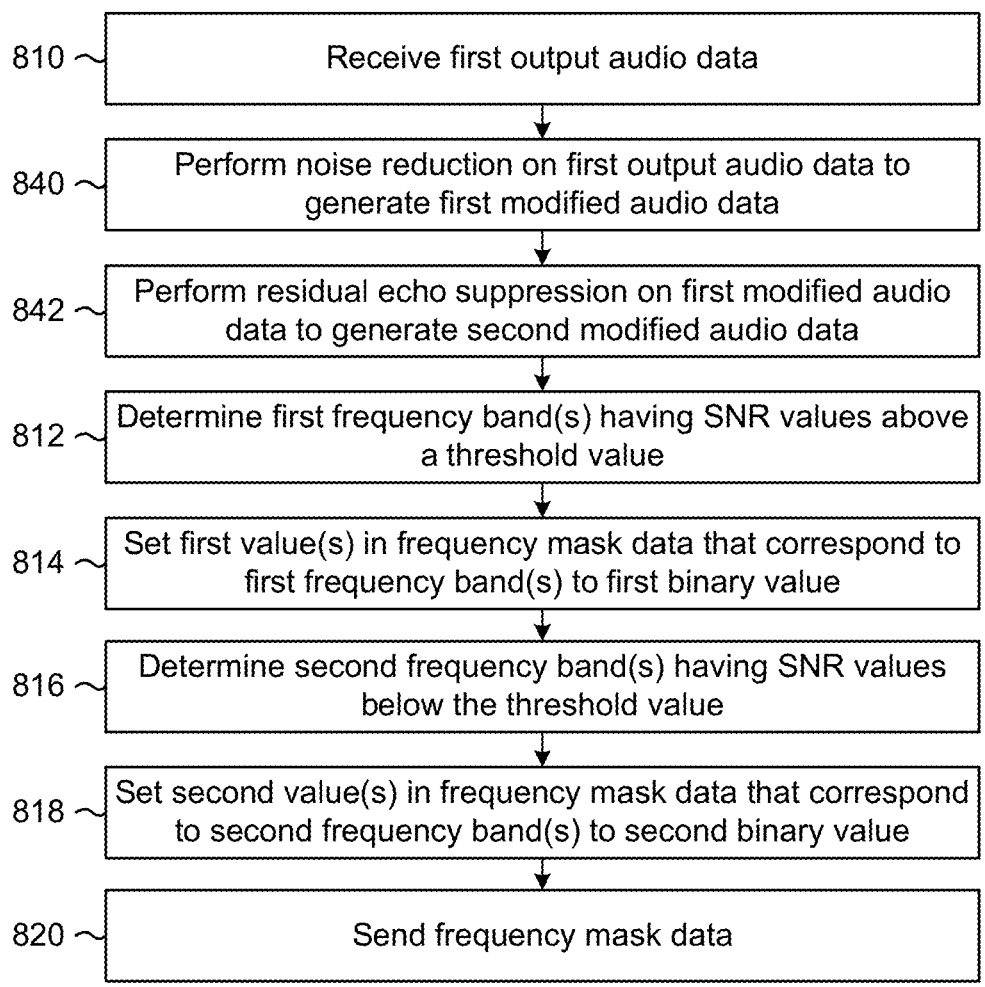
Figure 8C:
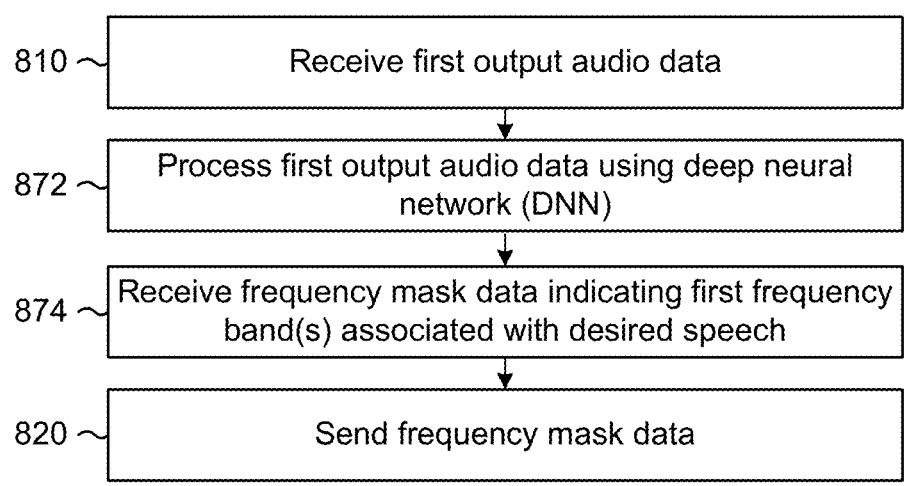

FIGS. 8A-8C are flowcharts conceptually illustrating example methods for generating frequency mask data according to embodiments of the present disclosure. As discussed above, the frequency mask data corresponds to a time-frequency map that indicates the first frequency bands that are associated with the first speech $s_1(t)$ over time. In addition, the frequency mask data may be used to determine second frequency bands that are not associated with the first speech $s_1(t)$ and are instead associated with the noise.

In order to generate the frequency mask data, the device 110 may divide the digitized output audio data 260 into frames representing time intervals and may separate the frames into separate frequency bands. The device 110 may analyze the output audio data 260 over time to determine which frequency bands and frame indexes correspond to the desired speech. For example, the device 110 may generate a binary mask indicating first frequency bands that correspond to the desired speech, with a first binary value (e.g., value of 0) indicating that the frequency band does not correspond to the desired speech and a second binary value (e.g., value of 1) indicating that the frequency band does correspond to the desired speech.

As illustrated in FIG. 8A, the device 110 may receive (810) first output audio data, may determine (812) first frequency band(s) in the first output audio data having signal-to-noise ratio (SNR) values above a threshold value (e.g., positive SNR values, if the threshold value is equal to zero), and may set (814) first value(s) in frequency mask data that correspond to the first frequency band(s) to the second binary value (e.g., logic high, indicating that the corresponding frequency is associated with the desired speech). While the first output audio data may suppress a portion of the desired speech, it does not suppress all of the desired speech and therefore positive values in the first output audio data indicate frequency bands that correspond to the desired speech.

In contrast, negative values in the first output audio data indicate second frequency band(s) that do not correspond to the desired speech. Therefore, the device 110 may determine (816) second frequency band(s) in the first output audio data having SNR values below the threshold value (e.g., negative SNR values, if the threshold value is equal to zero) and may set (818) second value(s) in the frequency mask data that correspond to the second frequency band(s) to the first binary value (e.g., logic low, indicating that the corresponding frequency is not associated with the desired speech).

The device 110 may then send (820) the frequency mask data to the reference generator to generate the modified reference signal.

In some examples, the device 110 may perform additional processing on the first output audio data, such as noise reduction (NR) processing, residual echo suppression (RES) processing, and/or the like to generate modified output audio data, and may identify frequency bands having a positive SNR value in the modified output audio data. While the additional processing reduces the echo and/or noise, it may aggressively attenuate the speech signal and is therefore not recommended for typical audio output, such as for automatic speech recognition (ASR) or during a communication session (e.g., audio and/or video conversation). However, as the device 110 performs a two-stage noise cancellation process, the device 110 may perform the additional processing on the first output audio data to identify the first frequency band(s) and then perform second noise cancellation, without the additional processing, to generate the second output audio data that is used for ASR and/or the communication session.

As illustrated in FIG. 8B, the device 110 may receive (810) the first output audio data, may perform (840) noise reduction on the first output audio data to generate first modified audio data, and may perform (842) residual echo suppression on the first modified audio data to generate second modified audio data. The device 110 may then repeat steps 812-820, using the second modified audio data instead of the first output audio data, to generate the frequency mask data.

Additionally or alternatively, the device 110 may process the first output audio data using a deep neural network (DNN) and may receive an indication of the first frequency band(s) (e.g., frequency mask data) from the DNN. For example, the device 110 may include a DNN configured to locate and track desired speech (e.g., first speech $s_1(t)$). The DNN may generate frequency mask data corresponding to individual frequency bands associated with the desired speech. The device 110 may determine a number of values, called features, representing the qualities of the audio data, along with a set of those values, called a feature vector or audio feature vector, representing the features/qualities of the audio data within the frame for a particular frequency band. In some examples, the DNN may generate the frequency mask data based on the feature vectors. Many different features may be determined, as known in the art, and each feature represents some quality of the audio that may be useful for the DNN to generate the frequency mask data. A number of approaches may be used by the device 110 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

While the example described above illustrates a single DNN configured to track the desired speech, the disclosure is not limited thereto. Instead, the device 110 may include a single DNN configured to track the noise, a first DNN configured to track the desired speech and a second DNN configured to track the noise, and/or a single DNN configured to track the desired speech and the noise. Each DNN may be trained individually, although the disclosure is not limited thereto. In some examples, a single DNN is configured to track multiple audio categories without departing from the disclosure. For example, a single DNN may be configured to locate and track the desired speech (e.g., generate a first binary mask corresponding to the first audio category) while also locating and tracking the noise source (e.g., generate a second binary mask corresponding to the second audio category). In some examples, a single DNN may be configured to generate three or more binary masks corresponding to three or more audio categories without departing from the disclosure. Additionally or alternatively, a single DNN may be configured to group audio data into different categories and tag or label the audio data accordingly. For example, the DNN may classify the audio data as first speech, second speech, music, noise, etc.

In some examples, the device 110 may process the audio data using one or more DNNs and receive one or more binary masks as output from the one or more DNNs. Thus, the DNNs may process the audio data and determine the feature vectors used to generate the one or more binary masks. However, the disclosure is not limited thereto and in other examples the device 110 may determine the feature vectors from the audio data, process the feature vectors using the one or more DNNs, and receive the one or more binary masks as output from the one or more DNNs. For example, the device 110 may perform a short-time Fourier transform (STFT) to the audio data to generate STFT coefficients and may input the STFT coefficients to the one or more DNNs as a time-frequency feature map.

The binary masks may correspond to binary flags for each of the time-frequency units, with a first binary value indicating that the time-frequency unit corresponds to the detected audio category (e.g., speech, music, noise, etc.) and a second binary value indicating that the time-frequency unit does not correspond to the detected audio category. For example, a first DNN may be associated with a first audio category (e.g., target speech) and a second DNN may be associated with a second audio category (e.g., noise). Each of the DNNs may generate a binary mask based on the corresponding audio category. Thus, the first DNN may generate a first binary mask that classifies each time-frequency unit as either being associated with the target speech or not associated with the target speech (e.g., associated with the noise), and the second DNN may generate a second binary mask that classifies each time-frequency unit as either being associated with the noise or not associated with the noise (e.g., associated with the target speech).

As illustrated in FIG. 8C, the device 110 may receive (810) the first output audio data, may process (872) the first output audio data using the DNN, may receive (874) the frequency mask data indicating first frequency band(s) associated with desired speech (e.g., local speech, such as the first speech $s_1(t)$ associated with the first user 5), and may send (820) the frequency mask data to the reference generator.

Figure 9:
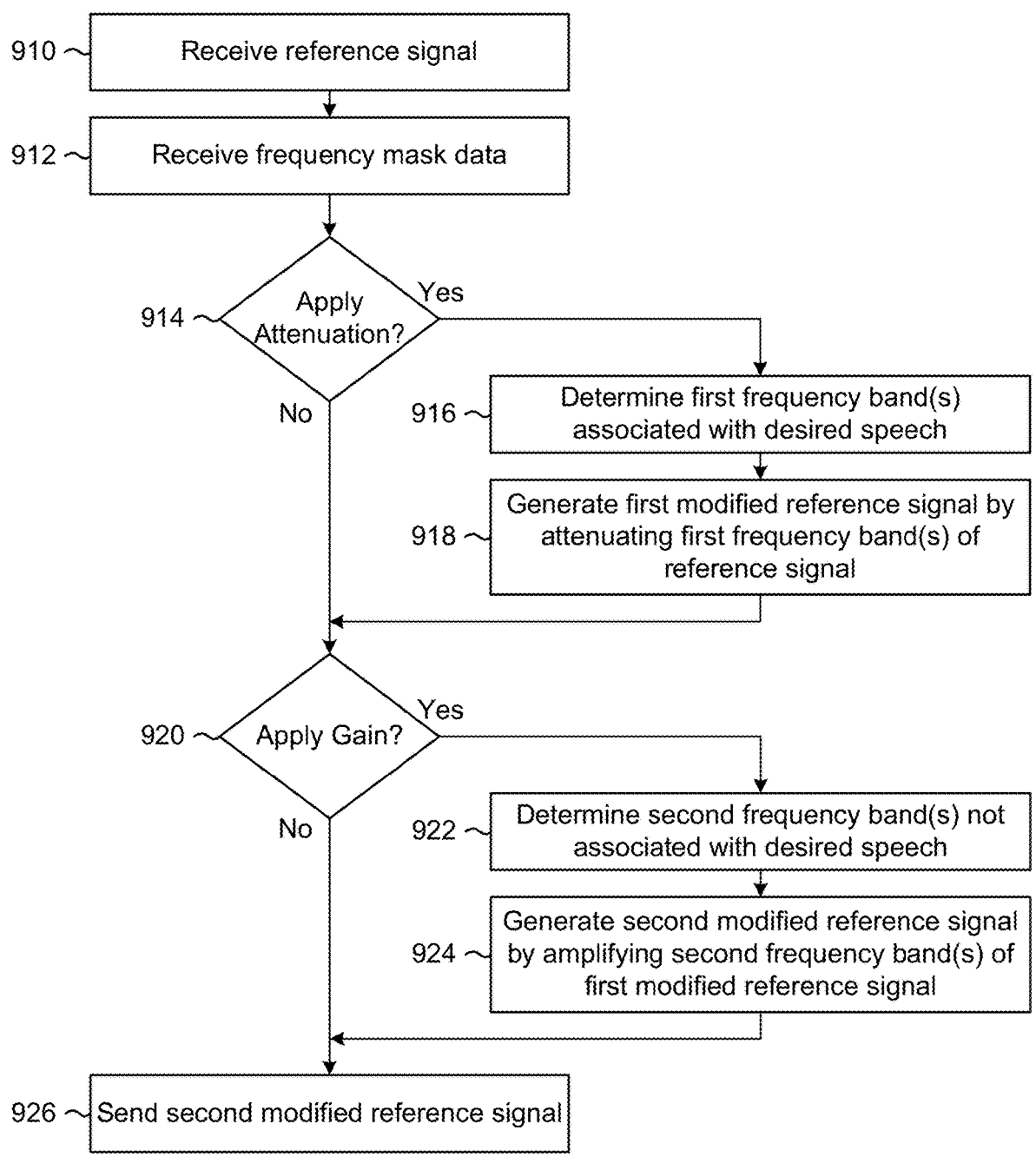
FIG. 9 is a flowchart conceptually illustrating an example method for modifying a reference signal according to embodiments of the present disclosure.

FIG. 9 is a flowchart conceptually illustrating an example method for modifying a reference signal according to embodiments of the present disclosure. As illustrated in FIG. 9, the device 110 may receive (910) a reference signal, may receive (912) frequency mask data, and may determine (914) whether to apply attenuation to the reference signal. If the device 110 determines to apply the attenuation to the reference signal, the device 110 may determine (916) first frequency band(s) associated with desired speech (e.g., local speech such as the first speech $s_1(t)$ associated with the first user 5) from the frequency mask data and may generate (918) a first modified reference signal by attenuating the first frequency band(s) of the reference signal. For example, the device 110 may apply an attenuation value v to the first portion(s) of the reference signal that correspond to the first frequency band(s), as discussed in greater detail above with regard to FIGS. 3 and 5.

The device 110 may determine (920) whether to apply gain to the reference signal and, if so, the device 110 may determine (922) second frequency band(s) not associated with the desired speech and may generate (924) a second modified reference signal by amplifying the second frequency band(s) of the first modified reference signal (or the reference signal, if the device 110 determined not to apply attenuation in step 914). For example, the device 110 may determine the second frequency band(s) from the frequency mask data and/or from the first frequency band(s) (e.g., assuming there is an inverse relationship between the first frequency band(s) and the second frequency band(s)) and may apply a gain value u to the second portion(s) of the first modified reference signal that correspond to the second frequency band(s), as discussed in greater detail above with regard to FIGS. 3 and 5. While step 922 illustrates the device 110 determining the second frequency band(s) that are not associated with the desired speech, the disclosure is not limited thereto and the device 110 may determine the second frequency band(s) that are associated with noise without departing from the disclosure.

The device 110 may then send (926) the second modified reference signal to the multi-channel noise canceller to perform a second stage of noise cancellation using the second modified reference signal instead of the reference signal.

In some examples, the device 110 may identify first beamformed audio data as a target signal (e.g., first beamformed audio data corresponding to a first direction, such as the direction associated with the first user 5) but may select reference signal(s) from two or more potential reference signals (e.g., second beamformed audio data corresponding to a second direction associated with the loudspeaker 14, third beamformed audio data corresponding to a third direction associated with the second user 7, etc.).

To illustrate an example using conventional noise cancellation that generates reference signal(s) from microphone audio data, a noise canceller may select the second beamformed audio data, the third beamformed audio data, or both the second and the third beamformed audio data as reference signal(s) (e.g., select a complete beam as reference signal(s)). Thus, the noise canceller either selects both the second beamformed audio data and the third beamformed audio data as a combined reference signal (e.g., performs noise cancellation using the complete second beamformed audio data and the complete third beamformed audio data) or chooses between the complete second beamformed audio data or the complete third beamformed audio data. For example, the noise canceller may generate first output audio data by subtracting at least a portion of the second beamformed audio data from the first beamformed audio data, may generate second output audio data by subtracting at least a portion of the third beamformed audio data from the first beamformed audio data, and may determine whether to select the first output audio data or the second output audio data based on signal quality metrics. Alternatively, the noise canceller may generate output audio data by subtracting at least a portion of the second beamformed audio data and at least a portion of the third beamformed audio data from the first beamformed audio data.

To further improve noise cancellation, FIG. 1B illustrates a system 100 that is configured to perform noise cancellation using portions of multiple potential reference signals. For example, instead of selecting an entirety of the second beamformed audio data or an entirety of the third beamformed audio data as reference signal(s), the device 110 may select a first portion of the second beamformed audio data (e.g., corresponding to first frequency bands) and select a second portion of the third beamformed audio data (e.g., corresponding to second frequency bands). Thus, if the second beamformed audio data has a higher average power value up until a frequency cutoff value, from which point the third beamformed audio data has a higher average power value, the device 110 may combine the two potential reference signals and perform noise cancellation using a portion of the second beamformed audio data (e.g., including frequency bands below the frequency cutoff value) and a portion of the third beamformed audio data (e.g., including frequency bands above the frequency cutoff value).

Figure 10:
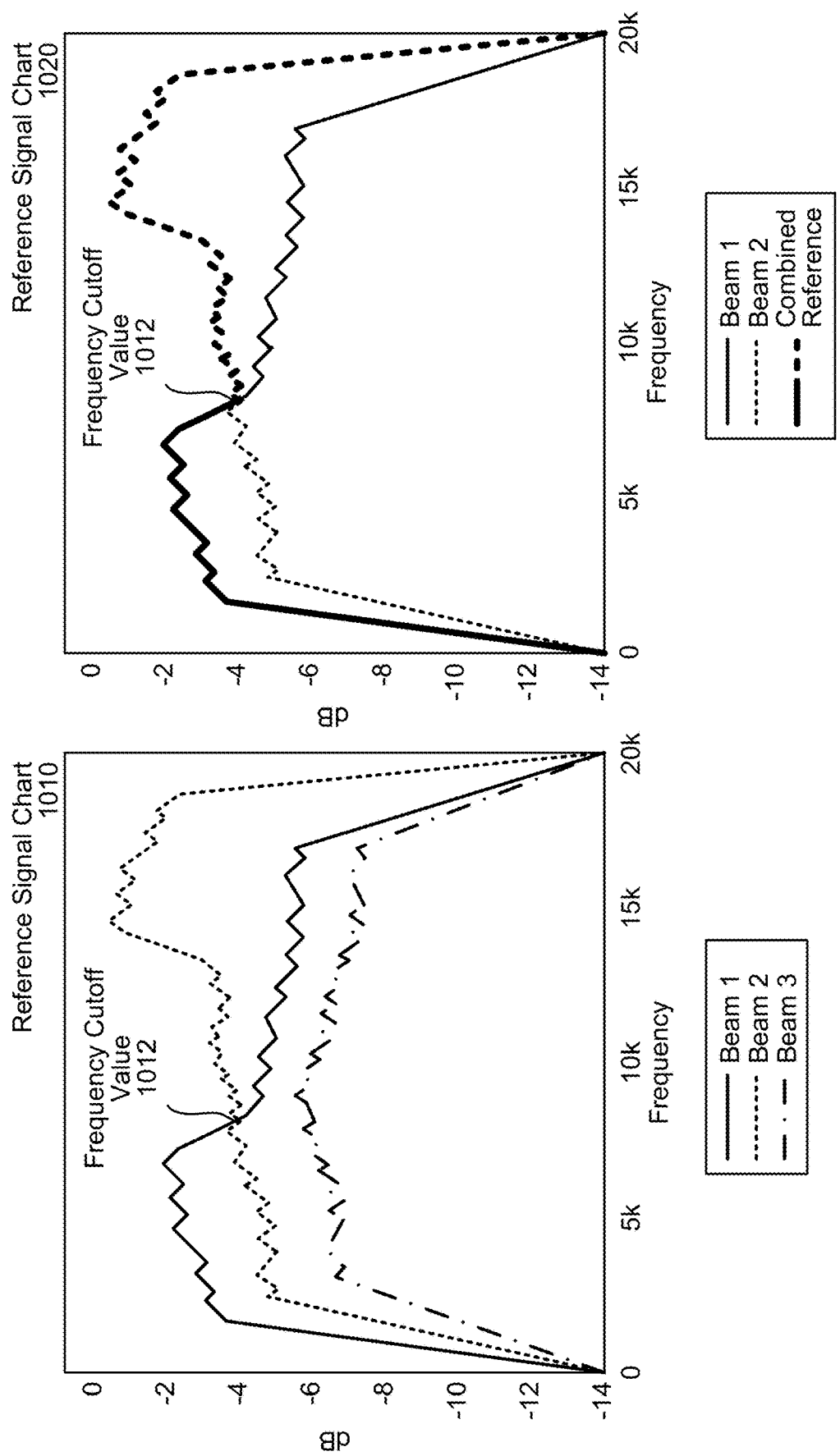
FIG. 10 illustrates an example of generating a combined reference signal according to embodiments of the present disclosure.

FIG. 10 illustrates an example of generating a combined reference signal according to embodiments of the present disclosure. As illustrated in FIG. 10, reference signal chart 1010 represents three "beams" (e.g., beamformed audio data). First beamformed audio data (e.g., Beam 1) is represented by a solid line and has a highest power value up until a frequency cutoff value 1012, after which the first beamformed audio data has a second highest power value. Second beamformed audio data (e.g., Beam 2) is represented by a dashed line and has a second highest power value up until the frequency cutoff value 1012, after which the second beamformed audio data has a highest power value. For ease of illustration, the example illustrated in FIG. 10 includes third beamformed audio data (e.g., Beam 3) that is represented by a dashdotted line (e.g., dot-and-dashed line, dot-dashed line, etc.) and has a third highest power value for every frequency band.

The device 110 may combine the first beamformed audio data (e.g., Beam 1) and the second beamformed audio data (e.g., Beam 2) to generate a combined reference signal that has a highest power value for every frequency band. For example, reference signal chart 1020 illustrates how a first portion of the first beamformed audio data (e.g., corresponding to frequency bands below the frequency cutoff value 1012, represented by the bolded solid line) is combined with a second portion of the second beamformed audio data (e.g., corresponding to frequency bands above the frequency cutoff value 1012, represented by the bolded dashed line). Thus, the combined reference signal corresponds to the highest power value for every frequency band.

Figure 11:
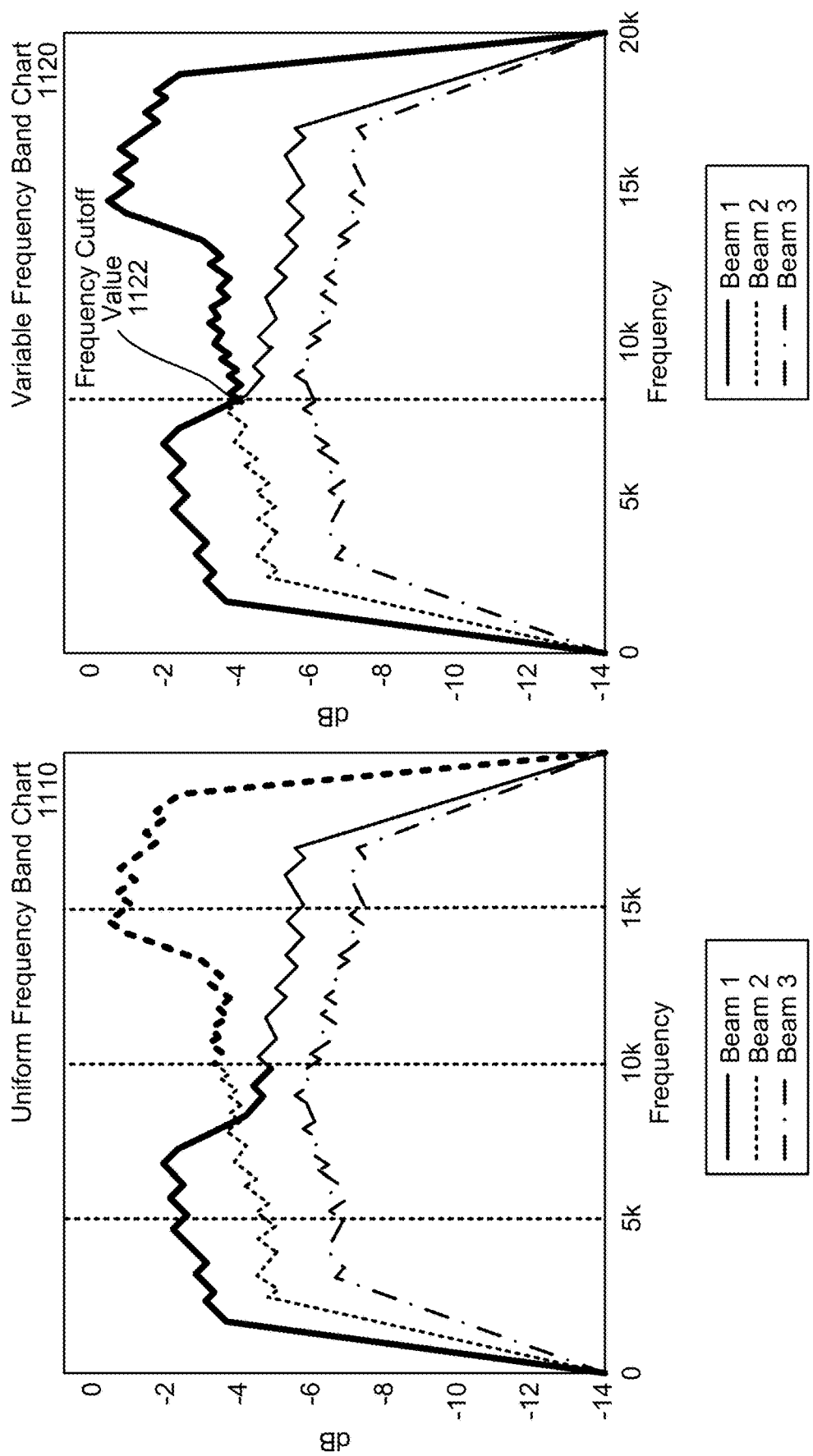
FIG. 11 illustrates examples of determining frequency bands and corresponding reference signals according to embodiments of the present disclosure.

FIG. 11 illustrates examples of determining frequency bands and corresponding reference signals according to embodiments of the present disclosure. In some examples, the device 110 may divide the frequency spectrum (e.g., 0 Hz to 20 Hz) using uniform frequency bands. For ease of illustration, FIG. 11 illustrates a simplified example in which the frequency spectrum is divided into four frequency bands (e.g., first frequency band corresponds to 0 Hz to 5 kHz, second frequency band corresponds to 5 kHz to 10 kHz, third frequency band corresponds to 10 kHz to 15 kHz, and fourth frequency band corresponds to 15 kHz to 20 kHz). However, the disclosure is not limited thereto and the device 110 may divide the frequency spectrum into any number of frequency bands without departing from the disclosure. Additionally or alternatively, the frequency spectrum is not limited to the range of human hearing (e.g., 0 Hz to 20 kHz) and may vary without departing from the disclosure.

As illustrated in the uniform frequency band chart 1110, the device 110 may generate a combined reference signal using portions of the first beamformed audio data for the first frequency band and the second frequency band and portions of the second beamformed audio data for the third frequency band and the fourth frequency band. Thus, the first beamformed audio data is selected as a first reference signal associated with the first frequency band and the second frequency band and the second beamformed audio data is selected as a second reference signal associated with the third frequency band and the fourth frequency band.

While a power value of the first beamformed audio data dips below a corresponding power value of the second beamformed audio data for a portion of the second frequency band, in this example the device 110 would still use the first beamformed audio data as the reference signal for these frequencies. In a practical application, the device 110 would select a larger number of frequency bands, increasing a likelihood that the combined reference signal has a highest power value of the potential reference signals for the corresponding frequency.

In other examples, the device 110 may divide the frequency spectrum (e.g., 0 Hz to 20 Hz) using variable frequency bands based on the potential reference signals (e.g., beamformed audio data). For example, the device 110 may determine a number of distinct frequency bands based on intersections between potential reference signals having a highest power value for a series of frequencies. For ease of illustration, FIG. 11 illustrates a simplified example in which the frequency spectrum is divided into two frequency bands, a first frequency band from 0 Hz to a frequency cutoff value 1122 (e.g., 8 kHz) and a second frequency band from the frequency cutoff value 1122 to 20 kHz. However, the disclosure is not limited thereto and the device 110 may divide the frequency spectrum into any number of frequency bands without departing from the disclosure. Additionally or alternatively, the frequency spectrum is not limited to the range of human hearing (e.g., 0 Hz to 20 kHz) and may vary without departing from the disclosure.

The device 110 may determine the frequency cutoff value 1122 based on an intersection between the first beamformed audio data and the second beamformed audio data. Based on the frequency cutoff value 1122, the device 110 may divide the frequency spectrum into two frequency bands and associate a potential reference signal with each frequency band. For example, the first beamformed audio data is selected as a first reference signal associated with the first frequency band (e.g., frequencies below the frequency cutoff value 1122 at 8 kHz) and the second beamformed audio data is selected as a second reference signal associated with the second frequency band (e.g., frequencies above the frequency cutoff value 1122 at 8 kHz).

After identifying the frequency cutoff value(s), determining frequency bands based on the frequency cutoff value(s), and associating a potential reference signal with each frequency band, in some examples the device 110 may generate a combined reference signal. As illustrated in the variable frequency band chart 1120, the combined reference signal includes portions of the first beamformed audio data for the first frequency band and portions of the second beamformed audio data for the second frequency band.

As the simplified example represented in the variable frequency band chart 1120 only includes a single intersection, the device 110 would determine the frequency cutoff value 1122 corresponding to the intersection and divide the frequency spectrum into two frequency bands based on the frequency cutoff value 1122. However, the disclosure is not limited thereto, and if there are additional intersections, the device 110 may divide the frequency spectrum into three or more frequency bands without departing from the disclosure. For example, if the first beamformed audio data exceeds the second beamformed audio data above 15 kHz, the device 110 may divide the frequency spectrum into three frequency bands using 15 kHz as a second frequency cutoff value. Thus, a first frequency band (e.g., 0 Hz to the first frequency cutoff value 1122 at 8 kHz) would be associated with the first beamformed audio data, a second frequency band (e.g., from the first frequency cutoff value 1122 at 8 kHz to the second frequency cutoff value at 15 kHZ) would be associated with the second beamformed audio data, and a third frequency band (e.g., from the second frequency cutoff value at 15 kHz to 20 kHz) would be associated with the first beamformed audio data.

While the examples illustrated in FIGS. 10-11 select from the potential reference signals based on a highest power value (e.g., signal-to-noise ratio, average power value, amplitude value, etc.), the disclosure is not limited thereto. Instead, the device 110 may select from the potential reference signals based on a variety of signal quality metrics. For example, the device 110 may determine signal metrics associated with audio quality, a correlation value between the potential reference signal and the target signal, and/or the like, selecting the reference signal to improve an output speech signal instead of selecting the reference signal only based on a highest power value of the potential reference signals. Additionally or alternatively, the device 110 may select from the potential reference signals using a DNN or the like. For example, the DNN may select the reference signal based on signal quality metrics, features (e.g., representing the qualities of the audio data), feature vector(s) (e.g., audio feature vector(s) representing the features/qualities of the audio data within a frame for a particular frequency band), and/or the like without departing from the disclosure.

As illustrated in FIG. 1B, the device 110 may receive (130) microphone audio data from the microphone array 112. The microphone audio data may include a plurality of signals from individual microphones in the microphone array 112, such that the device 110 may perform beamforming to separate the microphone audio data into beamformed audio data associated with unique directions. The device 110 may select (132) first audio data as a target signal (e.g., select first beamformed audio data associated with a first direction, such as in the direction of the first user 5).

The device 110 may select (164) a portion of second audio data corresponding to first frequency band(s) as a first reference signal and may select (166) a portion of third audio data corresponding to second frequency band(s) as a second reference signal. For example, as described above with regard to FIG. 11, the device 110 may select Beam 1 as a first reference signal for the first and second frequency bands (e.g., as represented in the uniform frequency band chart 1110) or just for the first frequency band (e.g., as represented in the variable frequency band chart 1120) and may select Beam 2 as a second reference signal for the third and fourth frequency bands (e.g., as represented in the uniform frequency band chart 1110) or just for the second frequency band (e.g., as represented in the variable frequency band chart 1120).

The device 110 may generate (168) combined output audio data by performing noise cancellation using the target signal, the first reference signal and the second reference signal, and may send (170) the combined output audio data for further processing and/or to a remote device.

Figure 12:
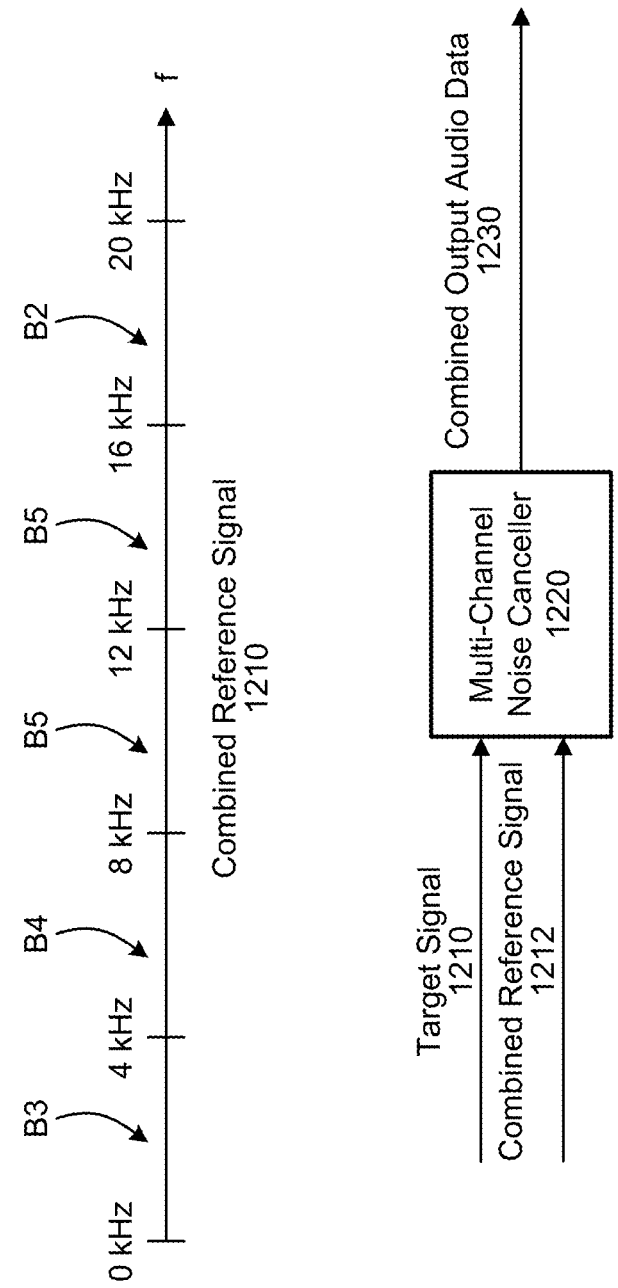
FIG. 12 illustrates an example of generating combined output audio data by generating a combined reference signal according to embodiments of the present disclosure.
Figure 13:
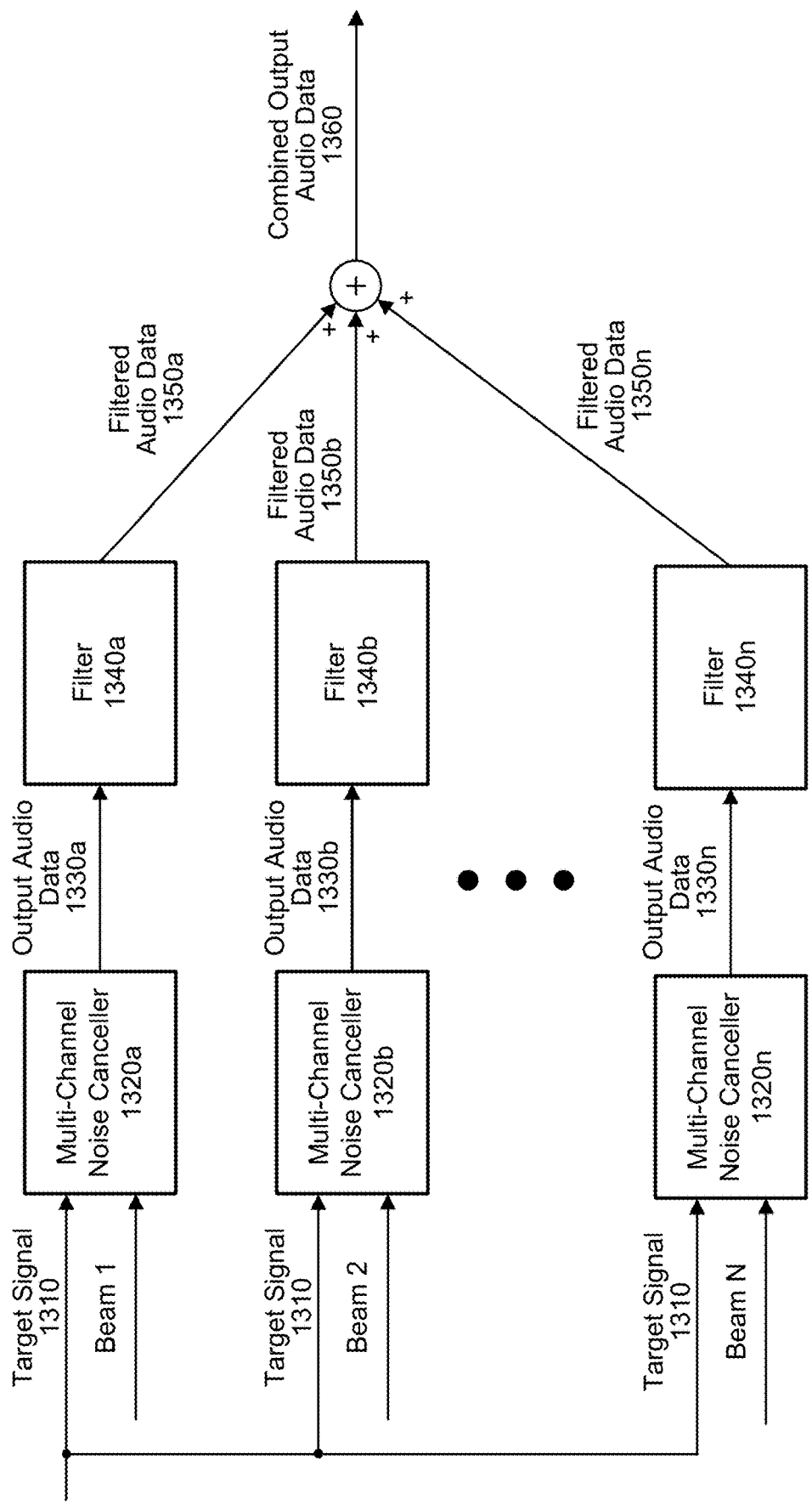
FIG. 13 illustrates an example of generating combined output audio data by performing noise cancellation for each reference signal according to embodiments of the present disclosure.
Figure 14:
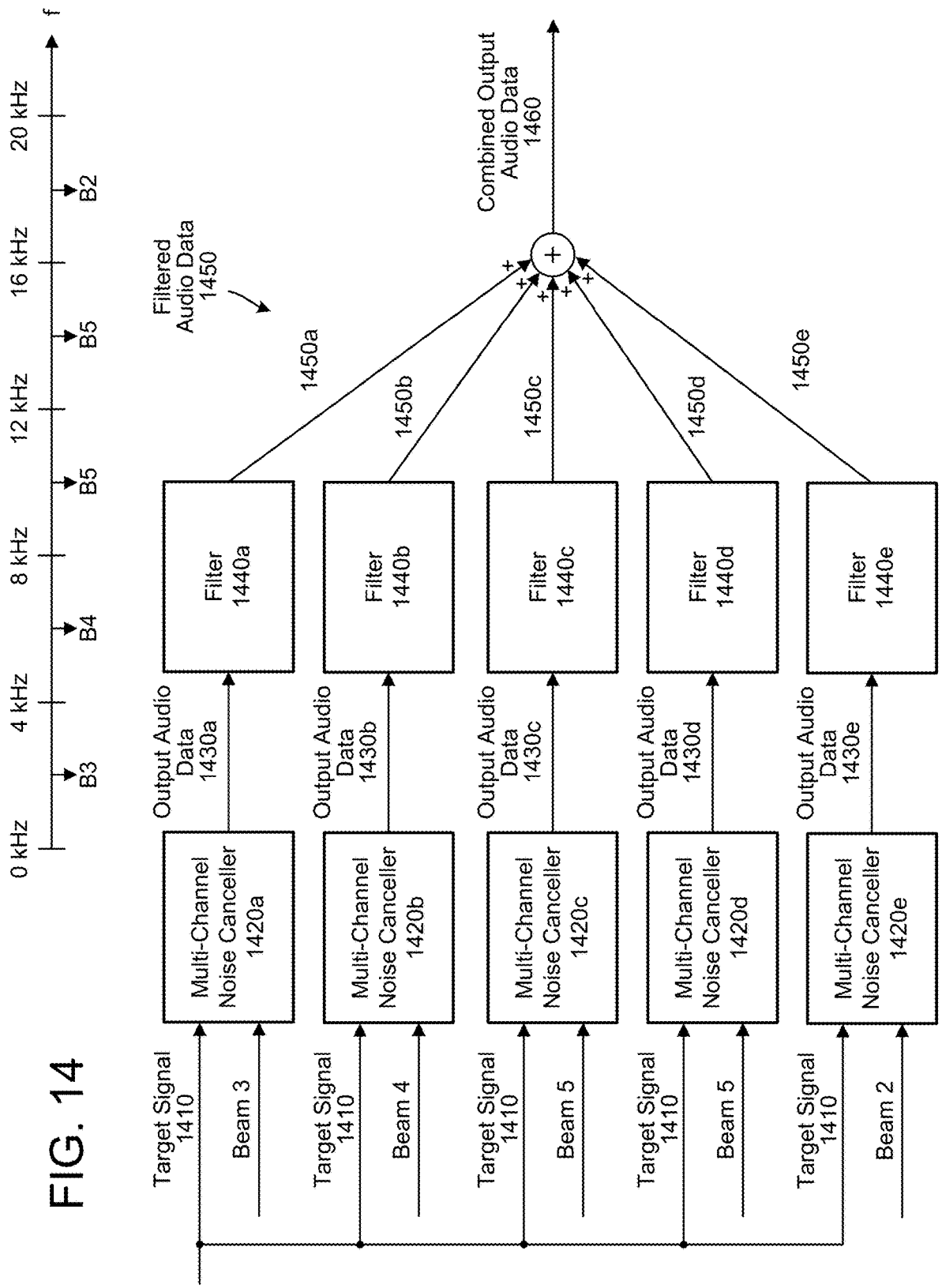
FIG. 14 illustrates an example of generating combined output audio data by performing noise cancellation for each frequency band according to embodiments of the present disclosure.

After determining which potential reference signal(s) to use for individual frequency bands, the device 110 may generate combined output audio data using multiple different techniques. As illustrated in FIGS. 10-11, in some examples the device 110 may generate a combined reference signal using the first reference signal (e.g., first frequency band(s)) and the second reference signal (e.g., second frequency band(s)), enabling the device 110 to generate combined output audio data by performing noise cancellation using the target signal and the combined reference signal. An example of this technique is illustrated in FIG. 12. However, the disclosure is not limited thereto, and in other examples the device 110 may select multiple reference signals and perform noise cancellation for each of the reference signals to generate multiple output audio signals. The device 110 may then generate the combined output audio data by selecting at least a portion from each of the output audio signals, as illustrated in FIGS. 13-14.

FIG. 12 illustrates an example of generating combined output audio data by generating a combined reference signal according to embodiments of the present disclosure. As illustrated in FIG. 12, the device 110 may divide the frequency spectrum into five frequency bands (e.g., first frequency band from 0 kHz to 4 kHz, second frequency band from 4 kHz to 8 kHz, third frequency band from 8 kHz to 12 kHz, fourth frequency band from 12 kHz to 16 kHz, and fifth frequency band from 16 kHz to 20 kHz) and may select a reference signal from potential reference signals for each of the frequency bands.

FIG. 12 illustrates an example in which the device 110 selects Beam 3 (e.g., B3) for the first frequency band, Beam 4 (e.g., B4) for the second frequency band, Beam 5 (e.g., B5) for the third frequency band, Beam 5 (e.g., B5) for the fourth frequency band, and Beam 2 (e.g., B2) for the fifth frequency band. Thus, a combined reference signal 1210 is comprised of a first portion from Beam 3 corresponding to frequencies between 0 Hz and 4 kHz, a second portion from Beam 4 corresponding to frequencies between 4 Hz and 8 kHz, a third portion from Beam 5 corresponding to frequencies between 8 Hz and 12 kHz, a fourth portion from Beam 5 corresponding to frequencies between 12 Hz and 16 kHz, and a fifth portion from Beam 2 corresponding to frequencies between 16 Hz and 20 kHz.

As illustrated in FIG. 12, the device 110 may input a target signal 1410 and the combined reference signal 1212 to a multi-channel noise canceller 1220 and the multi-channel noise canceller 1220 may perform noise cancellation to subtract at least a portion of the combined reference signal 1212 from the target signal 1210 to generate combined output audio data 1230.

While the example illustrated in FIG. 12 illustrates performing noise cancellation once to generate the combined output audio data, the disclosure is not limited thereto. Instead, in some examples the device 110 may perform noise cancellation for multiple reference signals to generate multiple output signals and may generate the combined output audio data based on the multiple output signals.

While the examples illustrated in FIGS. 10 and 12 are directed to generating a combined reference signal using discrete portions from the potential reference signal(s) for individual frequency bands, the disclosure is not limited thereto. Instead, the device 110 may combine two or more potential reference signal(s) within a single frequency band without departing from the disclosure. For example, the device 110 may determine N number of potential reference signals in a single frequency band, determine a weight value for each of the potential reference signals, and generate the combined reference signal by combining the potential reference signals based on corresponding weight values. To illustrate a simple example, the device 110 may combine a first potential reference signal and a second potential reference signal in a first frequency band using first weight values (e.g., weight value of 0.7 for the first potential reference signal and 0.3 for the second potential reference signal), may combine the first potential reference signal and the second potential reference signal in a second frequency band using second weight values (e.g., weight value of 0.4 for the first potential reference signal and 0.6 for the second potential reference signal), and/or may combine a third potential reference signal and a fourth potential reference signal in a third frequency band using third weight values (e.g., weight value of 0.5 for the third potential reference signal and 0.5 for the fourth potential reference signal) without departing from the disclosure. Performing noise cancellation using the combined reference signal generated by weighting the potential reference signals may further improve the output audio data.

FIG. 13 illustrates an example of generating combined output audio data by performing noise cancellation for each reference signal according to embodiments of the present disclosure. As illustrated in FIG. 13, the device 110 may determine that there are N reference signals and may perform noise cancellation for each of the reference signals to generate output audio data 1330. For example, the device 110 may perform first noise cancellation using a first multi-channel noise canceller 1320a to subtract at least a portion of a first reference signal (e.g., Beam 1) from a target signal 1310 and generate first output audio data 1330a. Similarly, the device 110 may perform second noise cancellation using a second multi-channel noise canceller 1320b to subtract at least a portion of a second reference signal (e.g., Beam 2) from a target signal 1310 and generate second output audio data 1330b, and so on for each of the reference signals.

While FIG. 13 illustrates the multi-channel noise cancellers 1320a-1320n as separate components, the disclosure is not limited thereto and a number of noise cancellers may vary without departing from the disclosure. For example, a single multi-channel noise canceller 1320 may perform all of the noise cancellation without departing from the disclosure.

After generating the output audio data 1330a-1330n, the device 110 may use filters 1340a-1340n to generate filtered audio data 1350a-1350n and may combine the filtered audio data 1350a-1350n to generate combined output audio data 1360. As the device 110 has already associated the reference signals with individual frequency bands, the filters 1340a-1340n may be configured to select portions of the output audio data 1330a-1330n corresponding to the associated frequency bands (e.g., pass frequencies within the frequency band and attenuate frequencies outside of the frequency band, which may be performed by a low-pass filter, a high-pass filter, a band-pass filter, and/or the like) to generate the filtered audio data 1350a-1350n. For example, the first reference signal (e.g., Beam 1) may be associated with first frequency band(s) and a first filter 1340a may be configured to generate first filtered audio data 1350a by filtering the first output audio data 1330a to only pass the first frequency band(s). Thus, the first frequency band(s) may correspond to a frequency range from 0 Hz to 4 kHz and the first filter 1340a may perform low-pass filtering to attenuate frequencies above 4 kHz, such that the first filtered audio data 1350a only corresponds to portions of the first output audio data 1330a below 4 kHz.

Using the example illustrated in FIG. 13, the device 110 may associate a single reference signal (e.g., first reference signal Beam 1) with multiple frequency bands, meaning the device 110 only needs to perform noise cancellation a single time for each reference signal. For example, each of the frequency bands associated with the first reference signal is input to the first filter 1340a, which passes portions of the first output audio data 1330a that corresponds to the frequency bands. Thus, the first frequency band(s) may correspond to a first frequency range from 0 Hz to 4 kHz and a second frequency range from 16 kHz to 20 kHz and the first filter 1340a may filter the first output audio data 1330a to attenuate frequencies between 4 kHz and 16 kHz, such that the first filtered audio data 1350a only corresponds to portions of the first output audio data 1330a below 4 kHz and above 16 kHz.

FIG. 14 illustrates an example of generating combined output audio data by performing noise cancellation for each frequency band according to embodiments of the present disclosure. As illustrated in FIG. 14, the device 110 may determine that there are five frequency bands and may perform noise cancellation for each of the frequency bands to generate output audio data 1430. For example, the device 110 may determine that a first frequency band (e.g., 0 kHz to 4 kHz) corresponds to a third reference signal (e.g., Beam 3) and may perform first noise cancellation using a first multi-channel noise canceller 1420a to subtract at least a portion of the third reference signal from a target signal 1410 and generate first output audio data 1430a. Similarly, the device 110 may determine that a second frequency band (e.g., 4 kHz to 8 kHz) corresponds to a fourth reference signal (e.g., Beam 4) and may perform second noise cancellation using a second multi-channel noise canceller 1420b to subtract at least a portion of the fourth reference signal from the target signal 1410 and generate second output audio data 1430b, and so on for each of the frequency bands (e.g., generating output audio data 1430a-1430e).

As discussed above, while FIG. 14 illustrates the multi-channel noise cancellers 1420a-1420n as separate components, the disclosure is not limited thereto and a number of noise cancellers may vary without departing from the disclosure. For example, a single multi-channel noise canceller 1420 may perform all of the noise cancellation without departing from the disclosure.

After generating the output audio data 1430a-1430e, the device 110 may use filters 1440a-1440e to generate filtered audio data 1450a-1450e and may combine the filtered audio data 1450a-1450e to generate combined output audio data 1460. As each of the output audio data 1430a-1430e is associated with a particular frequency band, the filters 1440a-1440e may be configured to select portions of the output audio data 1430a-1430e based on the corresponding frequency band (e.g., pass frequencies within the frequency band and attenuate frequencies outside of the frequency band, which may be performed by a low-pass filter, a high-pass filter, a band-pass filter, and/or the like) to generate the filtered audio data 1450a-1450e. For example, the first filter 1440a is associated with the first frequency band and may be configured to generate first filtered audio data 1450a by filtering the first output audio data 1430a to only pass frequencies within the first frequency band. Thus, if the first frequency band corresponds to a frequency range from 0 Hz to 4 kHz, the first filter 1440a may perform low-pass filtering to attenuate frequencies above 4 kHz, such that the first filtered audio data 1450a only corresponds to portions of the first output audio data 1430a below 4 kHz.

Figure 15:
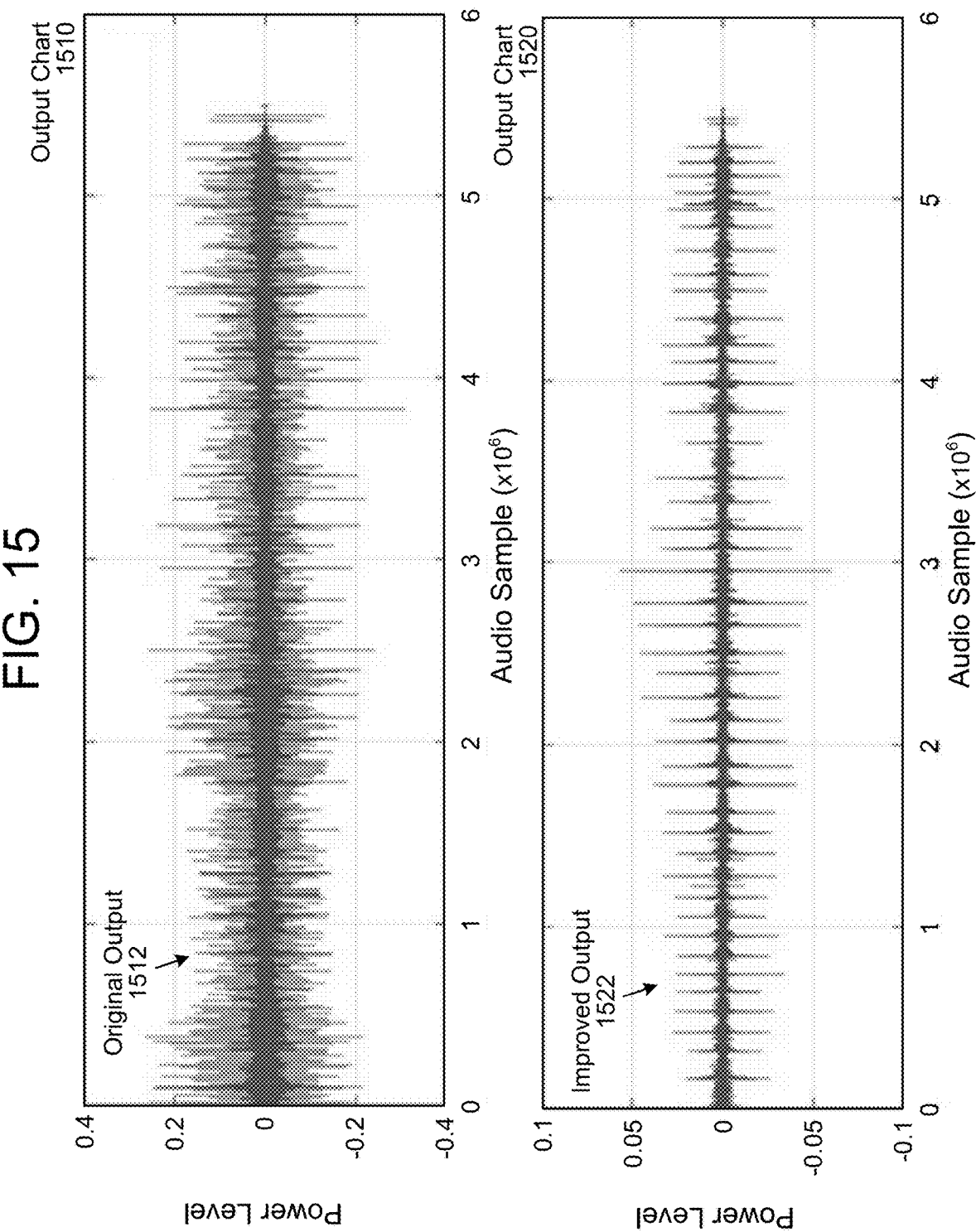
FIG. 15 illustrates examples of improvements to output audio data according to embodiments of the present disclosure.

FIG. 15 illustrates examples of improvements to output audio data according to embodiments of the present disclosure. As illustrated in FIG. 15, a first output chart 1510 represents an original output 1512 generated using a single reference signal and a second output chart 1520 represents an improved output 1522 generated using a combined reference signal. As illustrated in FIG. 15, the improved output 1522 has a much higher signal-to-noise ratio (SNR) value, as the amplitude is increased (e.g., peaks are taller) and the noise is reduced (e.g., jagged noise signal in the middle is noticeably thinner) relative to the original output 1512.

In the example illustrated in FIG. 15, a first amplitude of the original output 1512 is around 0.25 and a first noise level is roughly 0.06, corresponding to a first SNR value of around 4. In contrast, a second amplitude of the improved output 1522 is around 0.05 and a second noise level is roughly 0.004, corresponding to a second SNR value of around 12. Thus, the second SNR value is at least three times the first SNR value.

Figure 16A:
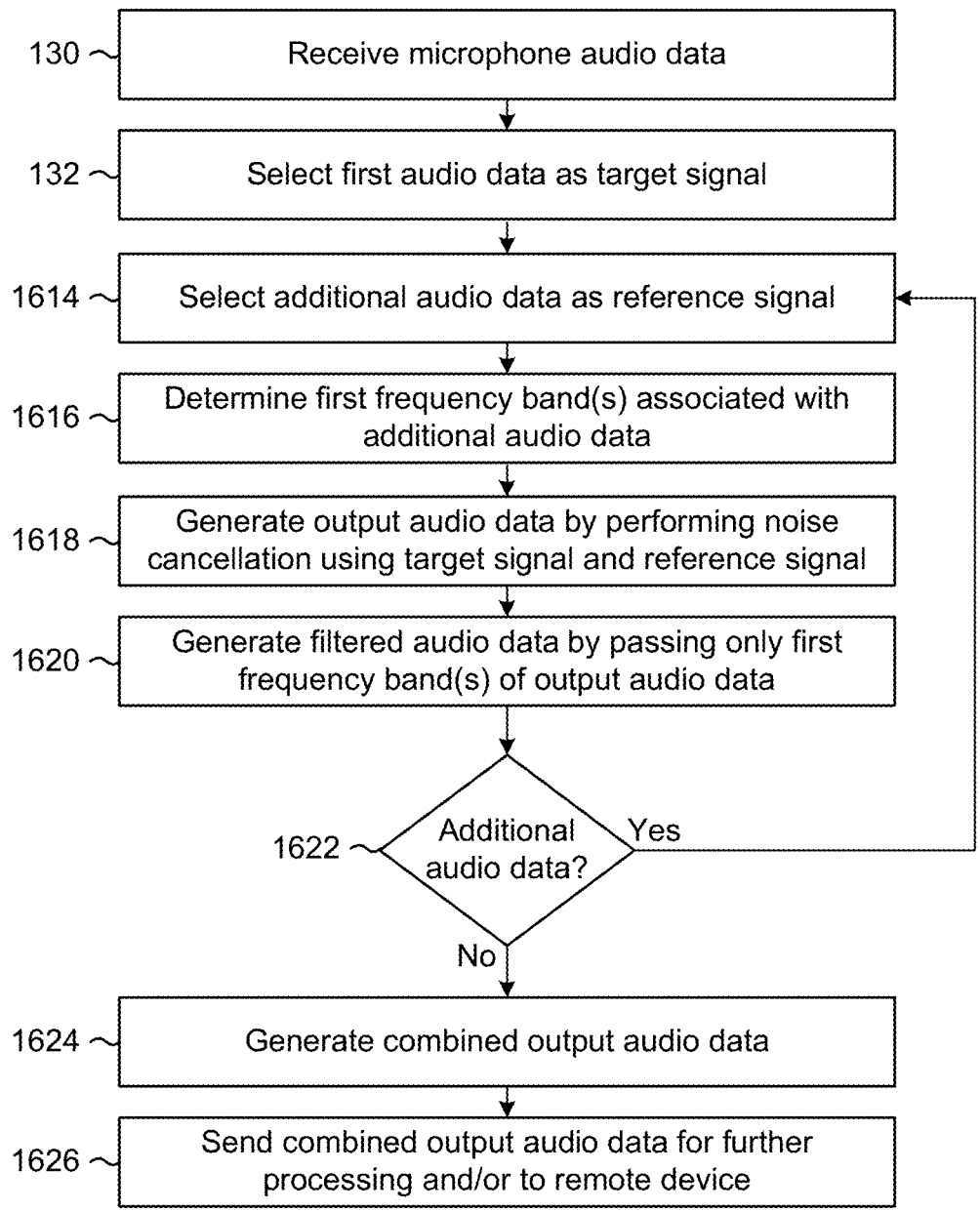
FIGS. 16A-16C are flowcharts conceptually illustrating example methods for generating output audio data using multiple reference signals according to embodiments of the present disclosure.
Figure 16B:
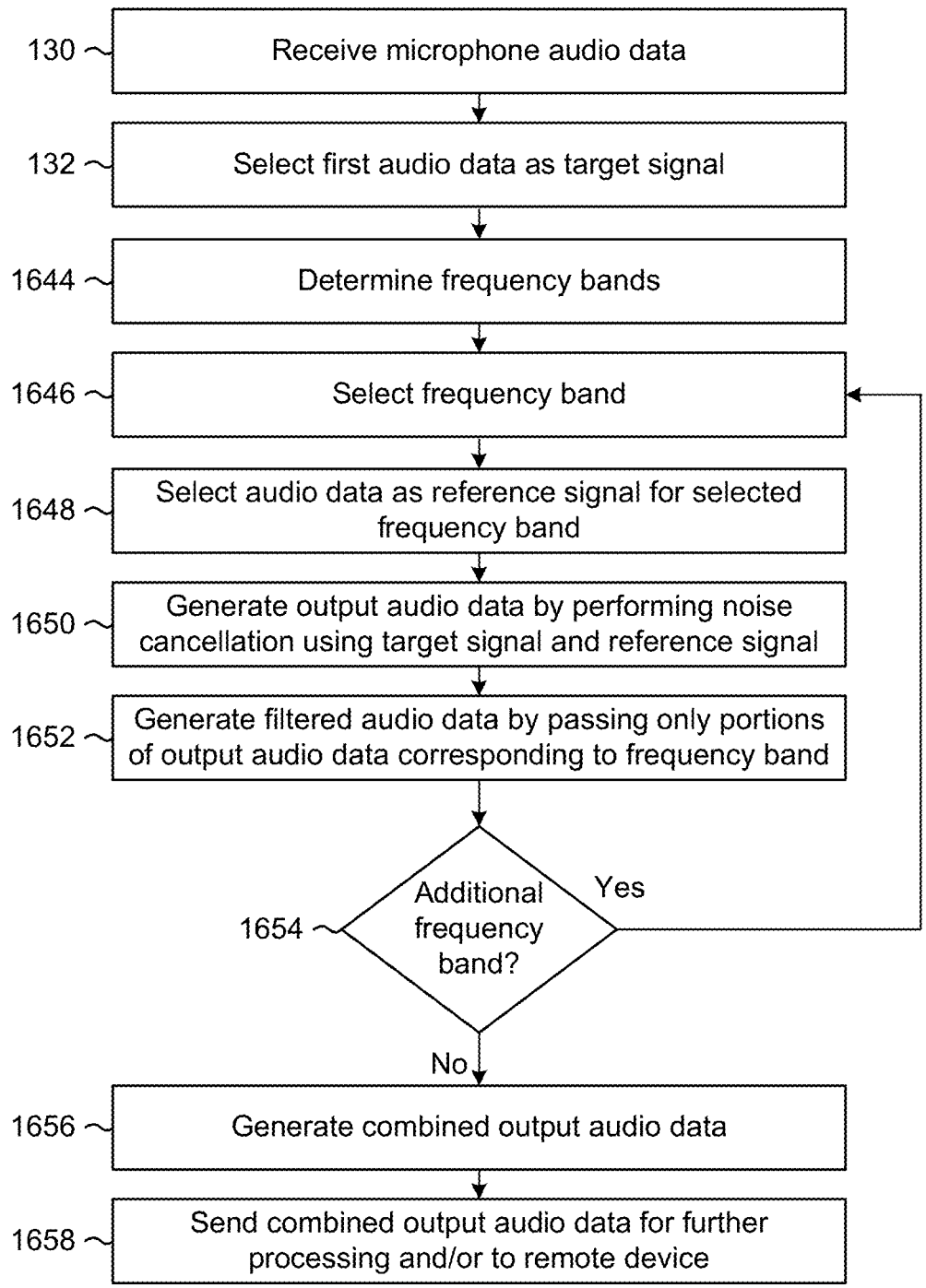
Figure 16C:
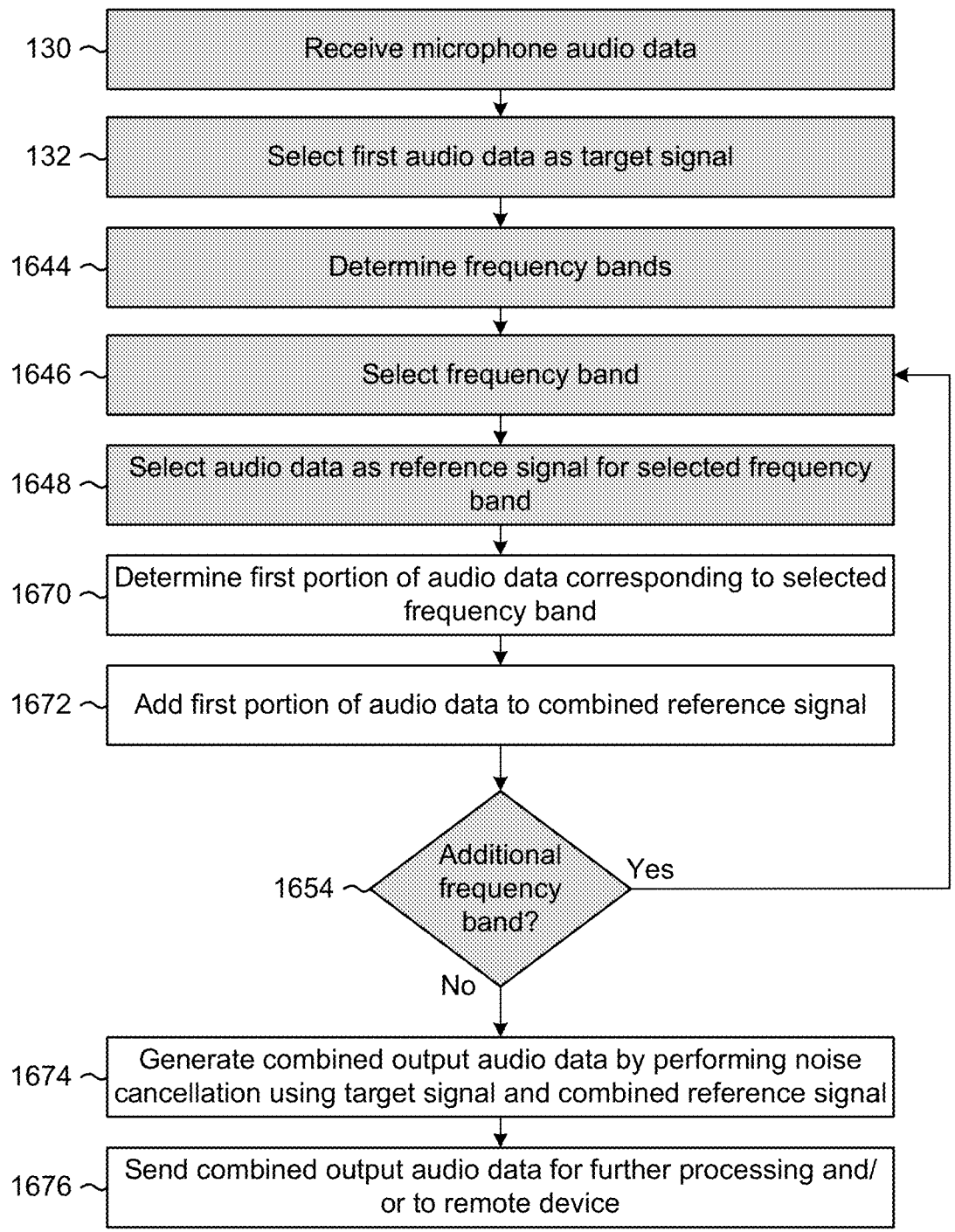

FIGS. 16A-16C are flowcharts conceptually illustrating example methods for generating output audio data using multiple reference signals according to embodiments of the present disclosure. As illustrated in FIG. 16A, the device 110 may receive (130) microphone audio data and select (132) first audio data from the microphone audio data as a target signal. The device 110 may select (1614) additional audio data as a reference signal, determine (1616) first frequency band(s) associated with the additional audio data, generate (1618) output audio data by performing noise cancellation using the target signal and the reference signal, and generate filtered audio data by passing only first frequency band(s) of the output audio data.

The device may determine (1622) whether there is additional audio data (e.g., additional reference signals) and, if so, may loop to step 1614 and repeat steps 1614-1620 for the additional audio data. Once every reference signal has been used to generate filtered audio data, the device 110 may generate (1624) combined output audio data by combining the filtered audio data associated with each reference signal and send (1626) the combined output audio data for further processing and/or to a remote device.

As illustrated in FIG. 16B, the device 110 may receive (130) microphone audio data and select (132) first audio data from the microphone audio data as a target signal. The device 110 may determine (1644) frequency bands (e.g., divide the frequency spectrum into uniform frequency bands or variable frequency bands) and may select (1646) a frequency band.

The device 110 may select (1648) audio data as a reference signal for the selected frequency band, may generate (1650) output audio data by performing noise cancellation using the target signal and the reference signal, and may generate (1652) filtered audio data by passing only portions of the output audio data corresponding to the frequency band.

The device 110 may determine (1654) whether there is an additional frequency band, and if so, may loop to step 1646 and repeat steps 1645-1652 for the additional frequency band. Once every frequency band has been used to generate filtered audio data, the device 110 may generate (1656) combined output audio data by combining the filtered audio data associated with each frequency band and may send (1658) the combined output audio data for further processing and/or to a remote device.

As illustrated in FIG. 16C, the device 110 may perform steps 130-1648, as described above with regard to FIG. 16B, to select a frequency band and select audio data as a reference signal for the selected frequency band. However, instead of generating the output audio data by performing noise cancellation multiple times (e.g., for each reference signal and/or frequency band), the device 110 may determine (1670) a first portion of the audio data that corresponds to the selected frequency band and add (1672) the first portion of the audio data to a combined reference signal. For example, the device 110 may select a first portion of first beamformed audio data that is within a first frequency band (e.g., 0 kHz to 4 kHz) and add it to the combined reference signal, may select a second portion of second beamformed audio data that is within a second frequency band (e.g., 4 kHz to 8 kHz) and add it to the combined reference signal, and so on for each frequency band.

The device 110 may determine (1654) whether there is an additional frequency band, and if so, may repeat this process for each additional frequency band, such that the combined reference signal covers the entire frequency spectrum (e.g., portion of audio data added for each frequency band). The device 110 may generate (1674) combined output audio data by performing noise cancellation using the target signal and the combined reference signal and may send (1676) the combined output audio data for further processing and/or to a remote device.

FIG. 17 is a block diagram conceptually illustrating example components of a system configured to perform noise cancellation according to embodiments of the present disclosure. In operation, the system 100 may include computer-readable and computer-executable instructions that reside on the device 110, as will be discussed further below.

As illustrated in FIG. 17, the device 110 may include an address/data bus 1724 for conveying data among components of the device 110. Each component within the device 110 may also be directly connected to other components in addition to (or instead of) being connected to other components across the bus 1724.

The device 110 may include one or more controllers/processors 1704, which may each include a central processing unit (CPU) for processing data and computer-readable instructions, and a memory 1706 for storing data and instructions. The memory 1706 may include volatile random access memory (RAM), non-volatile read only memory (ROM), non-volatile magnetoresistive (MRAM) and/or other types of memory. The device 110 may also include a data storage component 1708, for storing data and controller/processor-executable instructions (e.g., instructions to perform the algorithms illustrated in FIGS. 1A-1B, 7, 8A-8C, 9, and/or 16A-16C). The data storage component 1708 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1702.

The device 110 includes input/output device interfaces 1702. A variety of components may be connected through the input/output device interfaces 1702. For example, the device 110 may include one or more microphone(s) included in a microphone array 112 and/or one or more loudspeaker(s) 114 that connect through the input/output device interfaces 1702, although the disclosure is not limited thereto. Instead, the number of microphone(s) and/or loudspeaker(s) 114 may vary without departing from the disclosure. In some examples, the microphone(s) and/or loudspeaker(s) 114 may be external to the device 110.

The input/output device interfaces 1702 may be configured to operate with network(s) 10, for example a wireless local area network (WLAN) (such as WiFi), Bluetooth, ZigBee and/or wireless networks, such as a Long Term Evolution (LTE) network, WiMAX network, 3G network, etc. The network(s) 10 may include a local or private network or may include a wide network such as the internet. Devices may be connected to the network(s) 10 through either wired or wireless connections.

The input/output device interfaces 1702 may also include an interface for an external peripheral device connection such as universal serial bus (USB), FireWire, Thunderbolt, Ethernet port or other connection protocol that may connect to network(s) 10. The input/output device interfaces 1702 may also include a connection to an antenna (not shown) to connect one or more network(s) 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 110 may include components that may comprise processor-executable instructions stored in storage 1708 to be executed by controller(s)/processor(s) 1704 (e.g., software, firmware, hardware, or some combination thereof). For example, components of the device 110 may be part of a software application running in the foreground and/or background on the device 110. Some or all of the controllers/components of the device 110 may be executable instructions that may be embedded in hardware or firmware in addition to, or instead of, software.

In one embodiment, the device 110 may operate using an Android operating system (such as Android 4.3 Jelly Bean, Android 4.4 KitKat or the like), an Amazon operating system (such as FireOS or the like), or any other suitable operating system.

Executable computer instructions for operating the device 110 and its various components may be executed by the controller(s)/processor(s) 1704, using the memory 1706 as temporary "working" storage at runtime. The executable instructions may be stored in a non-transitory manner in non-volatile memory 1706, storage 1708, or an external device. Alternatively, some or all of the executable instructions may be embedded in hardware or firmware in addition to or instead of software.

The components of the device 110, as illustrated in FIG. 17, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for noise cancellation, the method comprising:
   determining first audio data that includes a first representation of speech;
   determining second audio data that includes a representation of music generated by a loudspeaker;
   subtracting at least a portion of the second audio data from the first audio data to generate first output audio data, wherein the first output audio data includes a second representation of the speech;
   detecting presence of the speech in at least a first frequency band of the first output audio data;
   determining a first portion of the second audio data that corresponds to the first frequency band;
   generating a first portion of third audio data by applying attenuation to the first portion of the second audio data, the attenuation reducing a value of the first portion of the third audio data relative to the first portion of the second audio data;
   determining a second portion of the second audio data that does not correspond to the first frequency band;
   generating a second portion of the third audio data by applying gain to the second portion of the second audio data, the gain increasing a value of the second portion of the third audio data relative to the second portion of the second audio data; and subtracting at least a portion of the third audio data from the first audio data to generate second output audio data, wherein the second output audio data includes a third representation of the speech.

2. The computer-implemented method of claim 1, further comprising:
   detecting presence of the speech in a first portion of the first output audio data, wherein the first portion of the first output audio data corresponds to the first frequency band at a first time;
   storing a value of one for a first portion of frequency mask data, wherein the first portion of the frequency mask data corresponds to the first frequency band at the first time;
   determining that speech is not detected in a second portion of the first output audio data, wherein the second portion of the first output audio data corresponds to a second frequency band at the first time; and
   storing a value of zero for a second portion of the frequency mask data, wherein the second portion of the frequency mask data corresponds to the second frequency band at the first time.

3. The computer-implemented method of claim 1, further comprising:
   performing residual echo suppression using the first output audio data to generate first modified output audio data;
   performing noise reduction on the first modified output audio data to generate second modified output audio data;
   converting the second modified output audio data from a time domain to a frequency domain to generate third modified output audio data in the frequency domain;
   determining that first signal-to-noise ratio (SNR) values of a first portion of the third modified output audio data are positive, wherein the first portion of the third modified output audio data corresponds to the first frequency band at a first time;
   determining, in response to determining that the first SNR values are positive, that the speech is present in at least the first frequency band of the third modified output audio data at the first time;
   storing a value of one for a first portion of frequency mask data, wherein the first portion of the frequency mask data corresponds to the first frequency band at the first time;
   determining that second SNR values of a second portion of the third modified output audio data are negative, wherein the second portion of the third modified output audio data corresponds to a second frequency band at the first time;
   determining, in response to determining that the second SNR values are negative, that the speech is not present in the second frequency band of the third modified output audio data at the first time; and
   storing a value of zero for a second portion of frequency mask data, wherein the second portion of the frequency mask data corresponds to the second frequency band at the first time.

4. The computer-implemented method of claim 1, wherein generating the first portion of the third audio data further comprises:
   converting the first output audio data from a time domain to a frequency domain to generate third output audio data in the frequency domain;
   determining a first estimated value for a first portion of the third output audio data, wherein the first portion of the third output audio data corresponds to the first frequency band at a first time, and the first estimated value indicates a percentage of the first portion of the third output audio data that corresponds to the speech;
   determining a second estimated value for the first portion of the third output audio data, wherein the second estimated value indicates a percentage of the first portion of the third output audio data that corresponds to noise;
   determining a first attenuation value based on the first estimated value and the second estimated value, wherein determining the first attenuation value further comprises:
      determining a first product by multiplying a second attenuation value by the first estimated value, wherein the second attenuation value is between zero and one;
      determining a second product by multiplying a gain value by the second estimated value, wherein the gain value is greater than one;
      determining a sum of the first product and the second product, and
      determining the first attenuation value by dividing the sum by the gain value; and
   generating the first portion of the third audio data by multiplying the first portion of the second audio data by the first gain value.

5. A computer-implemented method comprising:
   determining first audio data that includes a first representation of speech;
   determining second audio data that includes a representation of acoustic noise generated by at least one noise source;
   subtracting at least a portion of the second audio data from the first audio data to generate first output audio data, wherein the first output audio data includes a second representation of the speech;
   detecting presence of the speech in at least a first frequency band of the first output audio data;
   determining a first portion of the second audio data associated with the first frequency band;
   generating a first portion of third audio data based on the first portion of the second audio data;
   determining a second portion of the second audio data that is not associated with the first frequency band;
   generating a second portion of the third audio data by applying gain to the second portion of the second audio data;
   combining the first and second portions of the third audio data; and
   subtracting at least a portion of the third audio data from the first audio data to generate second output audio data, wherein the second output audio data includes a third representation of the speech.

6. The computer-implemented method of claim 5, further comprising:
   determining that a first portion of the first output audio data corresponds to the speech, the first portion of the first output audio data associated with a first time and the first frequency band;
   storing a first binary value for a first portion of frequency mask data corresponding to the first time and the first frequency band;
   determining that a second portion of the first output audio data does not correspond to the speech, the second portion of the first output audio data associated with the first time and a second frequency band; and storing a second binary value for a second portion of the frequency mask data corresponding to the first time and the second frequency band.

7. The computer-implemented method of claim 6, wherein:
determining that the first portion of the first output audio data corresponds to the speech further comprises determining that the first portion of the first output audio data has a positive signal-to-noise ratio (SNR) value; and
determining that the second portion of the first output audio data does not correspond to the speech further comprises determining that the second portion of the first output audio data has a negative SNR value.

8. The computer-implemented method of claim 5, wherein detecting the presence of the speech in at least the first frequency band of the first output audio data further comprises:
performing residual echo suppression using the first output audio data to generate first modified output audio data;
performing noise reduction on the first modified output audio data to generate second modified output audio data;
converting the second modified output audio data from a time domain to a frequency domain to generate third modified output audio data in the frequency domain; and
determining that a portion of the third modified output audio data associated with the first frequency band has a positive signal-to-noise ratio value.

9. The computer-implemented method of claim 5, further comprising:
determining a first average power value associated with the first audio data;
determining a second average power value associated with the second audio data;
determining that the second average power value is greater than the first average power value; and
outputting the first output audio data.

10. The computer-implemented method of claim 5, further comprising:
converting the first output audio data from a time domain to a frequency domain to generate third output audio data in the frequency domain;
determining a first estimated value for the first portion of the third output audio data, wherein the first portion of the third output audio data corresponds to the first frequency band at a first time, and the first estimated value indicates a percentage of the first portion of the third output audio data that corresponds to the speech;
determining a second estimated value for the first portion of the third output audio data, wherein the second estimated value indicates a percentage of the first portion of the third output audio data that corresponds to noise;
determining a first gain value based on the first estimated value and the second estimated value, wherein determining the first gain value further comprises:
determining a first product by multiplying an attenuation value by the first estimated value, wherein the attenuation value is between zero and one;
determining a second product by multiplying a second gain value by the second estimated value, wherein the second gain value is greater than one;
determining a sum of the first product and the second product, and
determining the first gain value by dividing the sum by the second gain value; and
generating the first portion of the third audio data by multiplying the first portion of the second audio data by the first gain value.

11. A device comprising:
at least one processor; and
memory including instructions operable to be executed by the at least one processor to perform a set of actions to cause the device to:
determine first audio data that includes a first representation of speech;
determine second audio data that includes a representation of acoustic noise generated by at least one noise source;
subtract at least a portion of the second audio data from the first audio data to generate first output audio data, wherein the first output audio data includes a second representation of the speech;
detecting presence of the speech in at least a first frequency band of the first output audio data;
determine a first portion of the second audio data associated with the first frequency band;
generate a first portion of third audio data by applying attenuation to the first portion of the second audio data:
determine a second portion of the second audio data that is not associated with the first frequency band;
generate a second portion of the third audio data based on the second portion of the second audio data;
combine the first and second portions of the third audio data; and
subtract at least a portion of the third audio data from the first audio data to generate second output audio data, wherein the second output audio data includes a third representation of the speech.

12. The device of claim 11, wherein the memory further comprises instructions that, when executed by the at least one processor, further cause the device to:
determine that a first portion of the first output audio data corresponds to the speech, the first portion of the first output audio data associated with a first time and the first frequency band;
store a first binary value for a first portion of frequency mask data corresponding to the first time and the first frequency band;
determine that a second portion of the first output audio data does not correspond to the speech, the second portion of the first output audio data associated with the first time and a second frequency band; and
store a second binary value for a second portion of the frequency mask data corresponding to the first time and the second frequency band.

13. The device of claim 12, wherein the memory further comprises instructions that, when executed by the at least one processor, further cause the device to:
determine that the first portion of the first output audio data corresponds to the speech by determining that the first portion of the first output audio data has a positive signal-to-noise ratio (SNR) value; and
determine that the second portion of the first output audio data does not correspond to the speech by determining that the second portion of the first output audio data has a negative SNR value.

14. The device of claim 11, wherein the memory further comprises instructions that, when executed by the at least one processor, further cause the device to:

perform residual echo suppression using the first output audio data to generate first modified output audio data;
perform noise reduction on the first modified output audio data to generate second modified output audio data;
convert the second modified output audio data from a time domain to a frequency domain to generate third modified output audio data in the frequency domain; and
determine that a portion of the third modified output audio data associated with the first frequency band has a positive signal-to-noise ratio value.

15. The device of claim 11, wherein the memory further comprises instructions that, when executed by the at least one processor, further cause the device to:
determine a first average power value associated with the first audio data;
determine a second average power value associated with the second audio data;
determine that the second average power value is greater than the first average power value; and
output the first output audio data.

16. The device of claim 11, wherein the memory further comprises instructions that, when executed by the at least one processor, further cause the device to:
convert the first output audio data from a time domain to a frequency domain to generate third output audio data in the frequency domain;
determine a first estimated value for e first portion of the third output audio data, wherein the first portion of the third output audio data corresponds to the first frequency band at a first time, and the first estimated value indicates a percentage of the first portion of the third output audio data that corresponds to the speech;
determine a second estimated value for the first portion of the third output audio data, wherein the second estimated value indicates a percentage of the first portion of the third output audio data that corresponds to noise;
determine a first gain value based on the first estimated value and the second estimated value, wherein determining the first gain value further comprises:
determining a first product by multiplying an attenuation value by the first estimated value, wherein the attenuation value is between zero and one;
determining a second product by multiplying a second gain value by the second estimated value, wherein the second gain value is greater than one;
determining a sum of the first product and the second product, and
determining the first gain value by dividing the sum by the second gain value; and
generate the first portion of the third audio data by multiplying the first portion of the second audio data by the first gain value.

* * * * *